Figure 1:
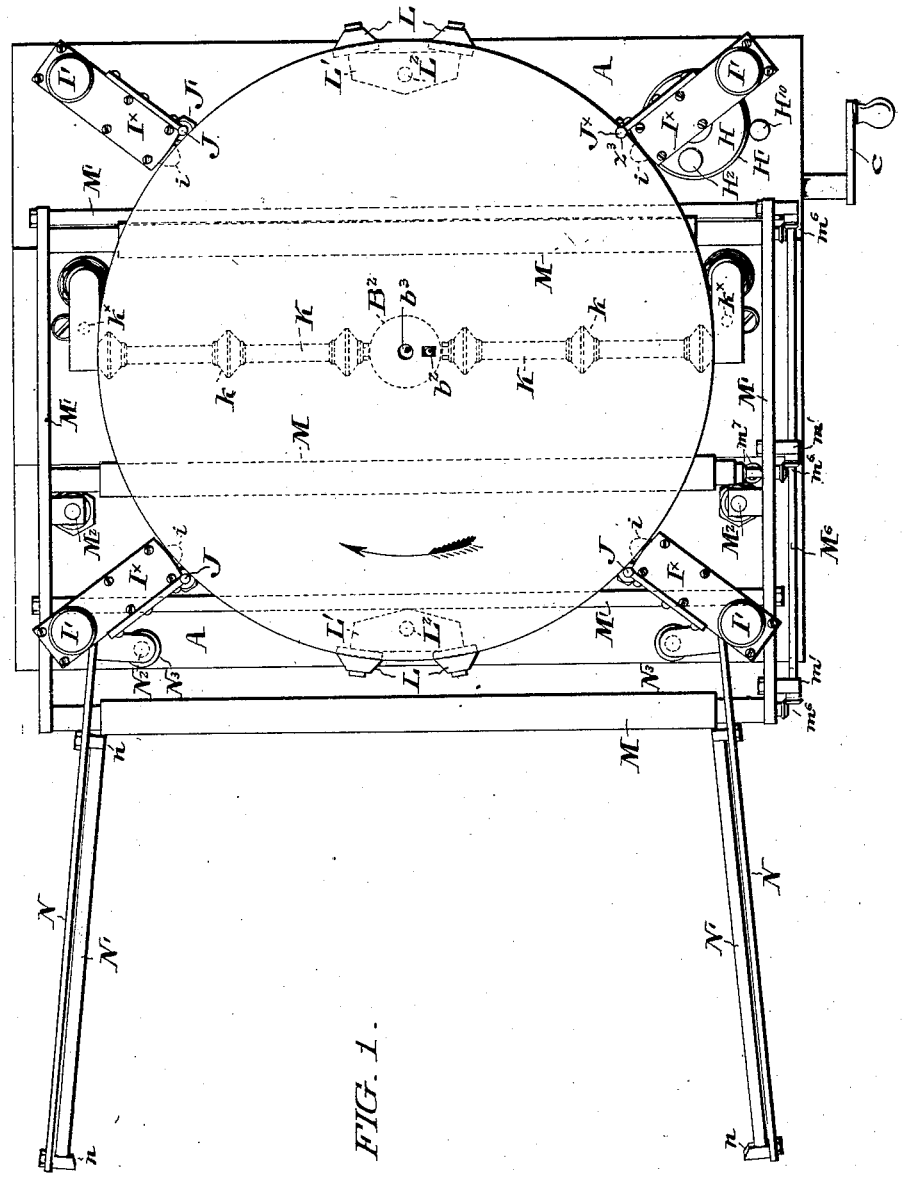

No. 728,449. PATENTED MAY 19, 1903.
W. A. DRYSDALE.
MUSIC BOX.
APPLICATION FILED FEB. 18, 1898.
NO MODEL. 17 SHEETS—SHEET 1.

WITNESSES:
E. L. Fullerton.
Geo. P. McArthur

INVENTOR:
WILLIAM A. DRYSDALE
By, Arthur E. Paige
Atty.

No. 728,449. PATENTED MAY 19, 1903.
W. A. DRYSDALE.
MUSIC BOX.
APPLICATION FILED FEB. 18, 1898.
NO MODEL. 17 SHEETS—SHEET 3.

WITNESSES:
E. L. Fullerton.
Geo. P. McArthur.

INVENTOR:
WILLIAM A. DRYSDALE
By Arthur E. Paige
Atty.

No. 728,449. PATENTED MAY 19, 1903.
W. A. DRYSDALE.
MUSIC BOX.
APPLICATION FILED FEB. 18, 1898.
NO MODEL. 17 SHEETS—SHEET 4.

WITNESSES:
E. L. Fullerton.
Geo. P. McArthur

INVENTOR:
WILLIAM A. DRYSDALE
By, Arthur E. Paige
Atty.

No. 728,449. PATENTED MAY 19, 1903.
W. A. DRYSDALE.
MUSIC BOX.
APPLICATION FILED FEB. 18, 1898.
NO MODEL. 17 SHEETS—SHEET 5.

WITNESSES:
E. L. Fullerton
Geo. P. McArthur

INVENTOR:
WILLIAM A. DRYSDALE
By Arthur E. Paige
Atty.

No. 728,449. PATENTED MAY 19, 1903.
W. A. DRYSDALE.
MUSIC BOX.
APPLICATION FILED FEB. 18, 1898.
NO MODEL. 17 SHEETS—SHEET 6.
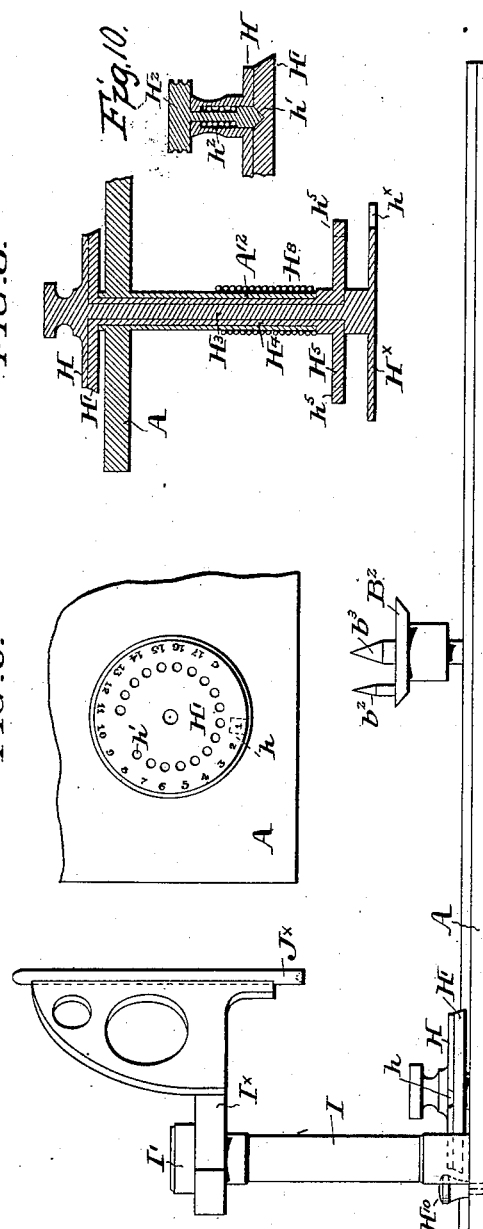
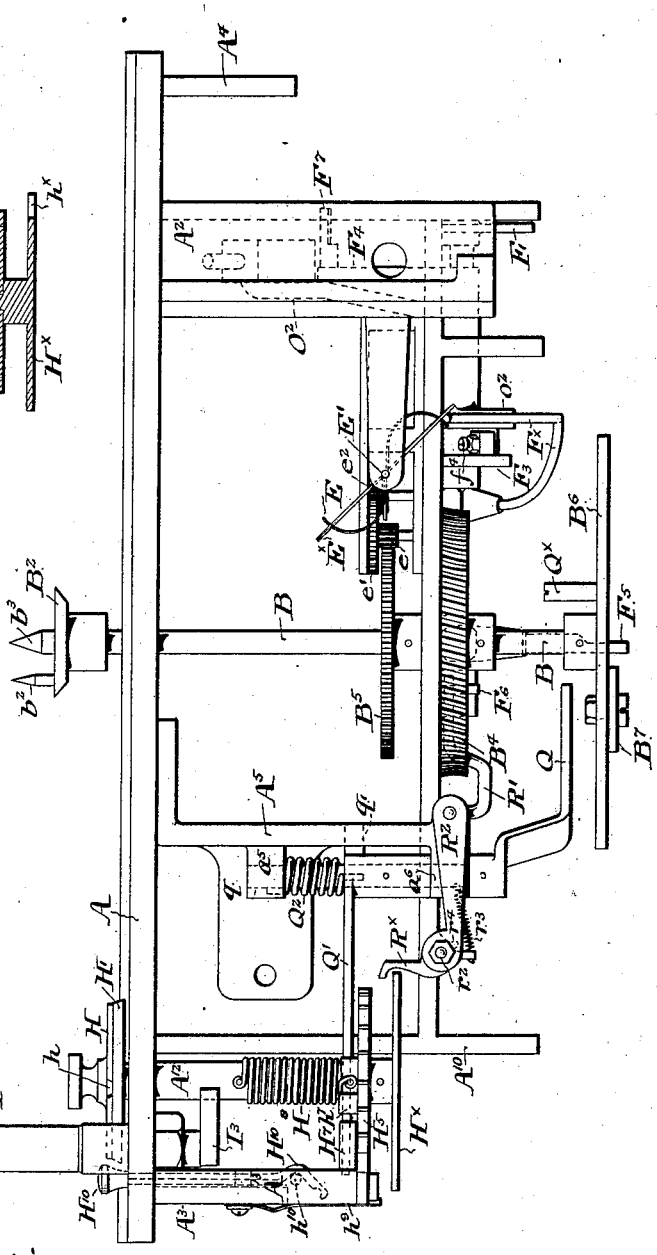
WITNESSES:
E. L. Fullerton.
Geo. P. McArthur
INVENTOR:
WILLIAM A. DRYSDALE
By Arthur E. Paige
Atty.

No. 728,449. PATENTED MAY 19, 1903.
W. A. DRYSDALE.
MUSIC BOX.
APPLICATION FILED FEB. 18, 1898.
NO MODEL. 17 SHEETS—SHEET 7.

WITNESSES:
E. L. Fullerton.
Geo. P. McArthur

INVENTOR:
WILLIAM A. DRYSDALE
By, Arthur E. Paige
Atty.

No. 728,449. PATENTED MAY 19, 1903.
W. A. DRYSDALE.
MUSIC BOX.
APPLICATION FILED FEB. 18, 1898.
NO MODEL. 17 SHEETS—SHEET 8.
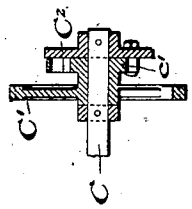
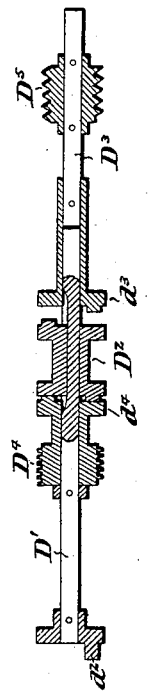
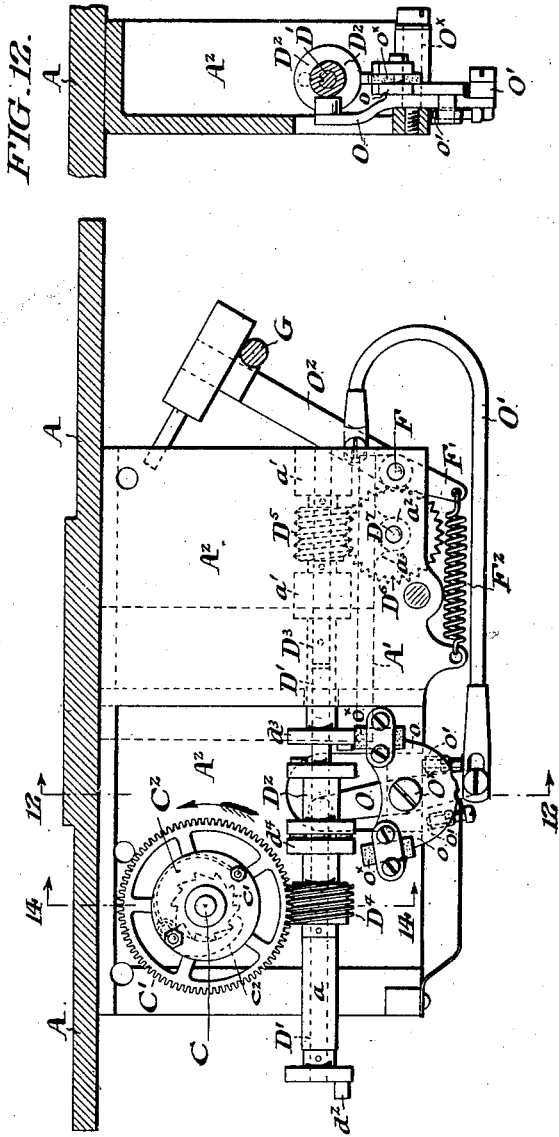
WITNESSES:
E. L. Fullerton.
Geo. P. McArthur.
INVENTOR:
WILLIAM A. DRYSDALE
By, Arthur E. Paige
Atty.

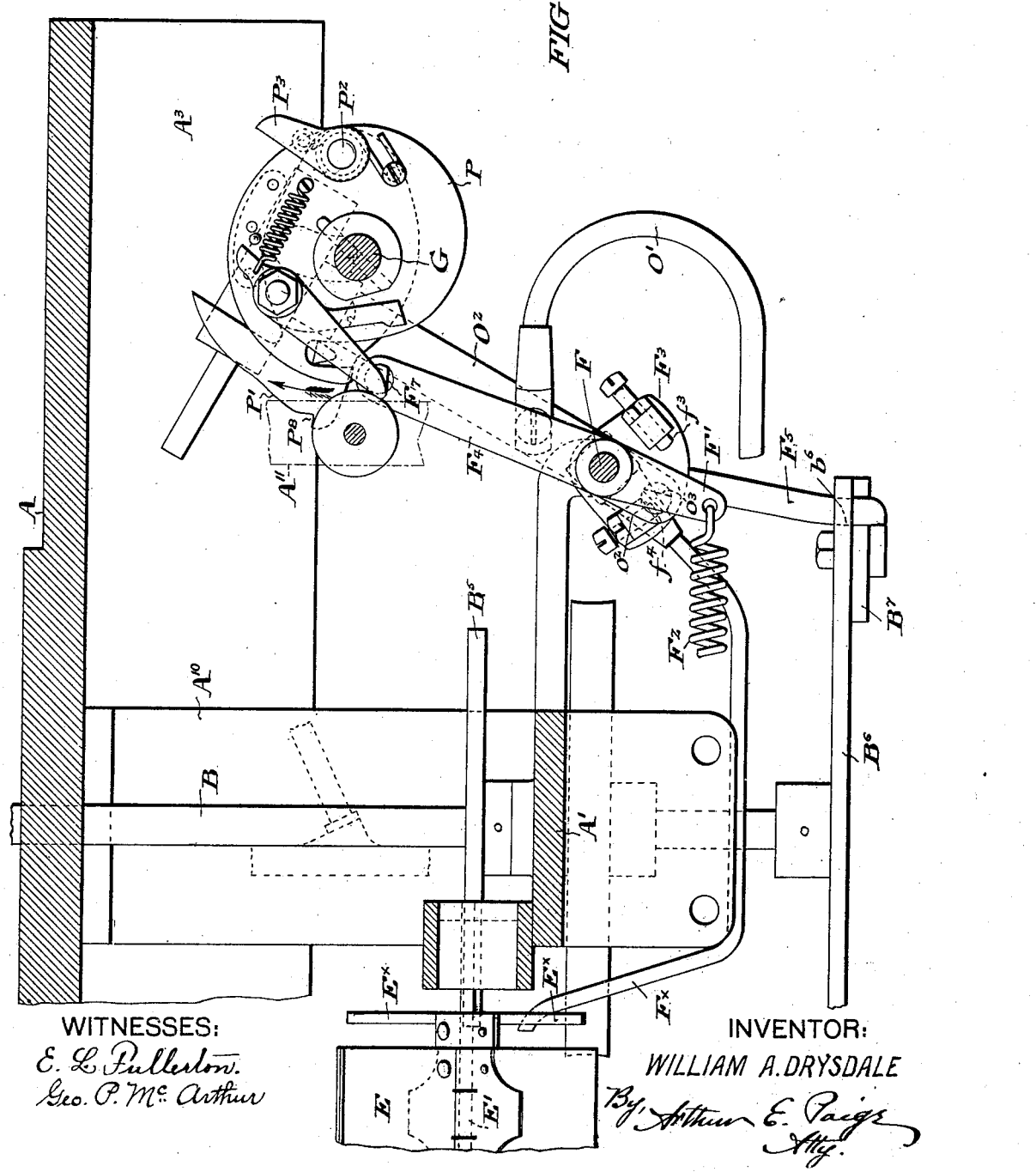

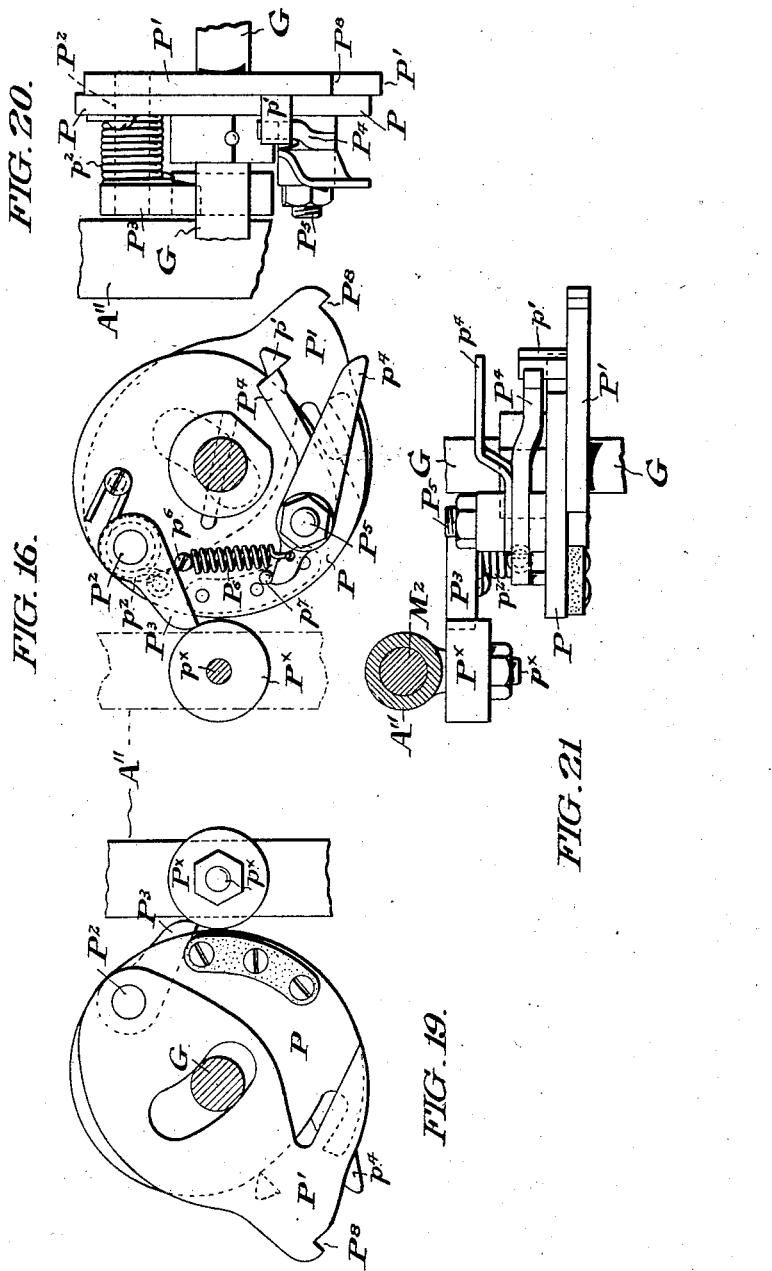

No. 728,449. PATENTED MAY 19, 1903.
W. A. DRYSDALE.
MUSIC BOX.
APPLICATION FILED FEB. 18, 1898.
NO MODEL. 17 SHEETS—SHEET 11.
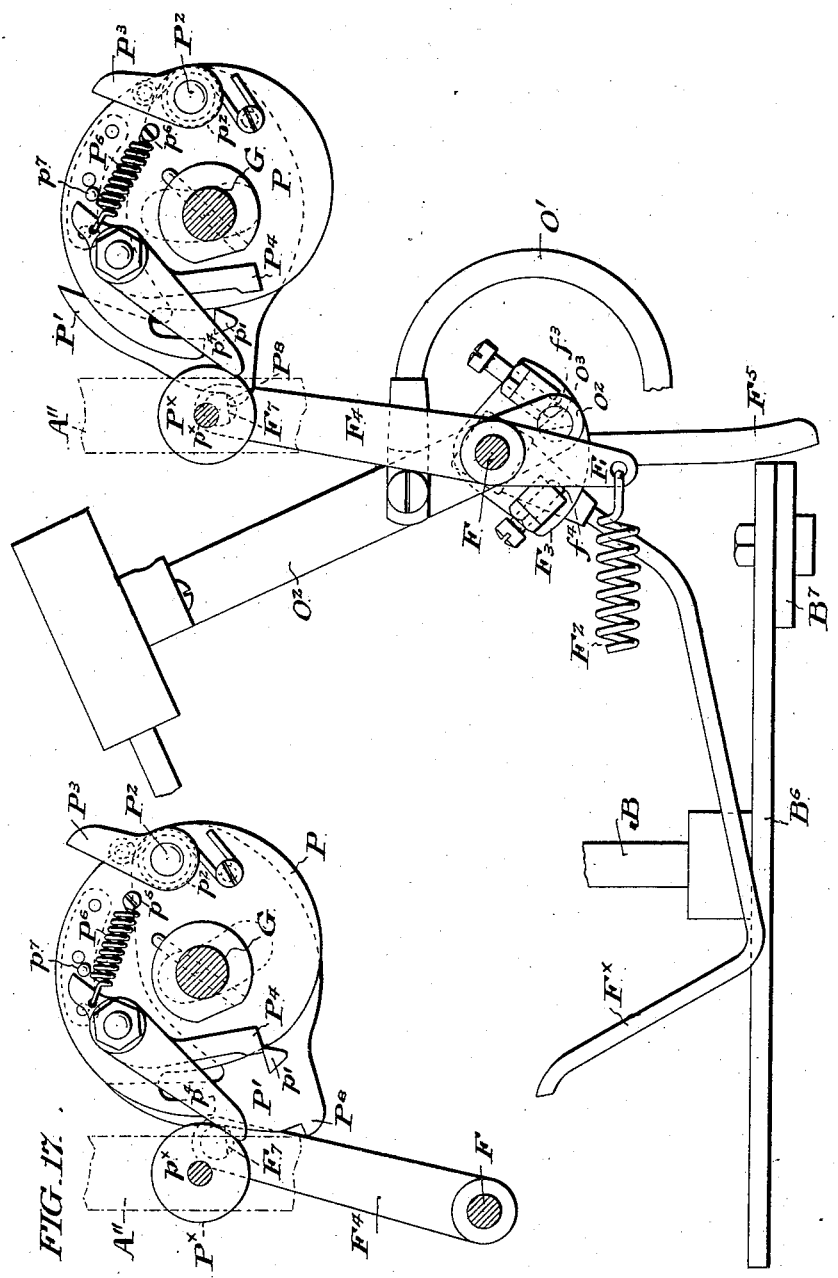
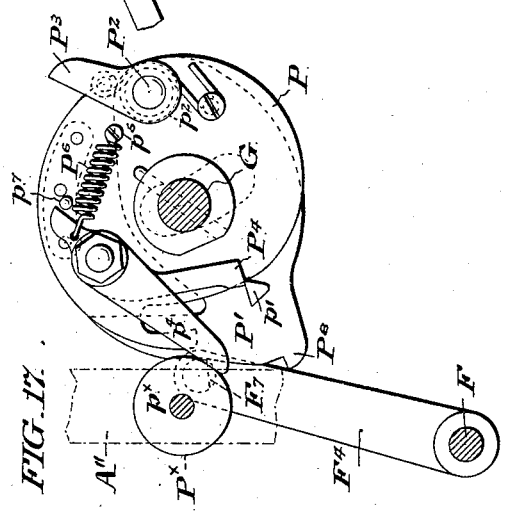
WITNESSES: INVENTOR:
E. L. Fullerton. WILLIAM A. DRYSDALE
Geo. P. McArthur By Arthur E. Paige
Atty.
THE NORRIS PETERS CO., PHOTO-LITHO., WASHINGTON, D. C.

No. 728,449. PATENTED MAY 19, 1903.
W. A. DRYSDALE.
MUSIC BOX.
APPLICATION FILED FEB. 18, 1898.
NO MODEL. 17 SHEETS—SHEET 12.
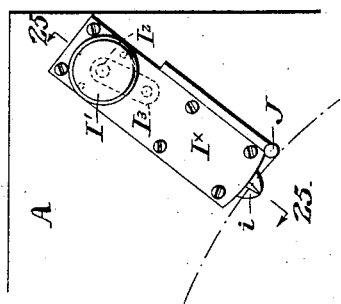
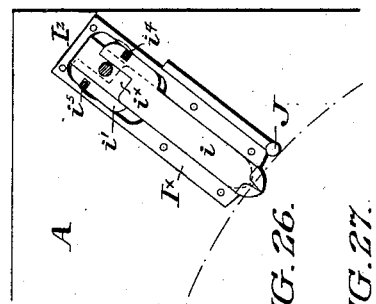
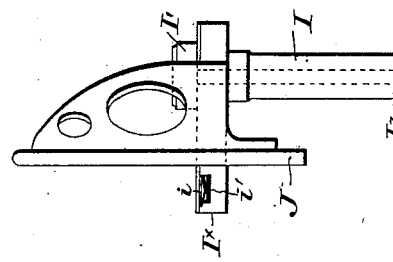
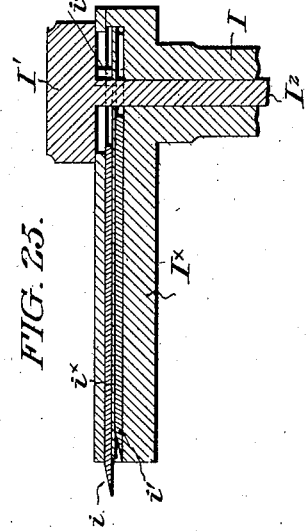
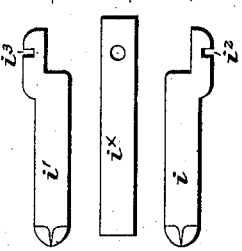
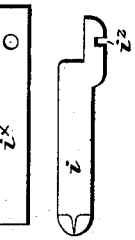
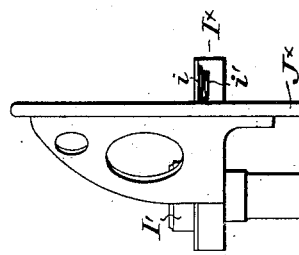
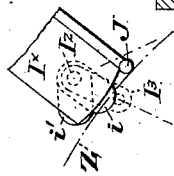
WITNESSES:
E. L. Fullerton.
Geo. P. McArthur.
INVENTOR:
WILLIAM A. DRYSDALE
By Arthur E. Paige
Atty.

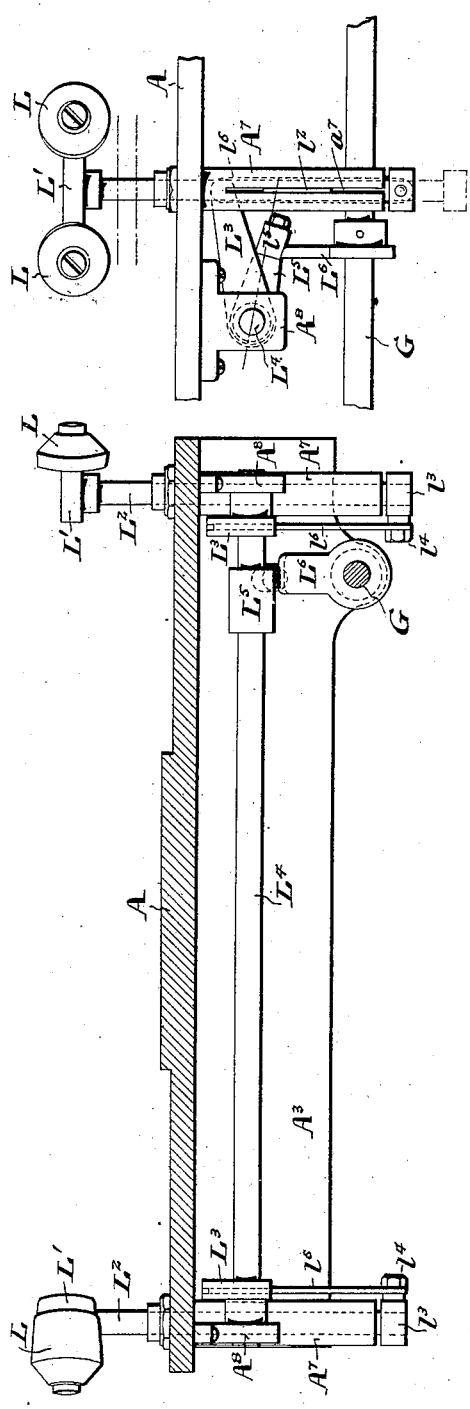

No. 728,449. PATENTED MAY 19, 1903.
W. A. DRYSDALE.
MUSIC BOX.
APPLICATION FILED FEB. 18, 1898.
NO MODEL. 17 SHEETS—SHEET 14.
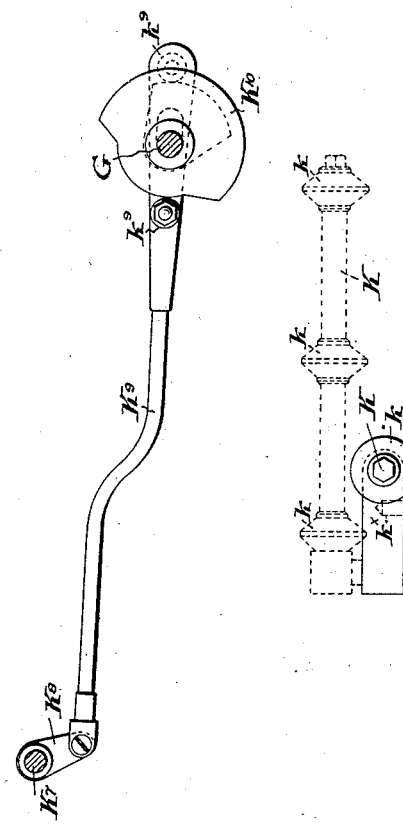
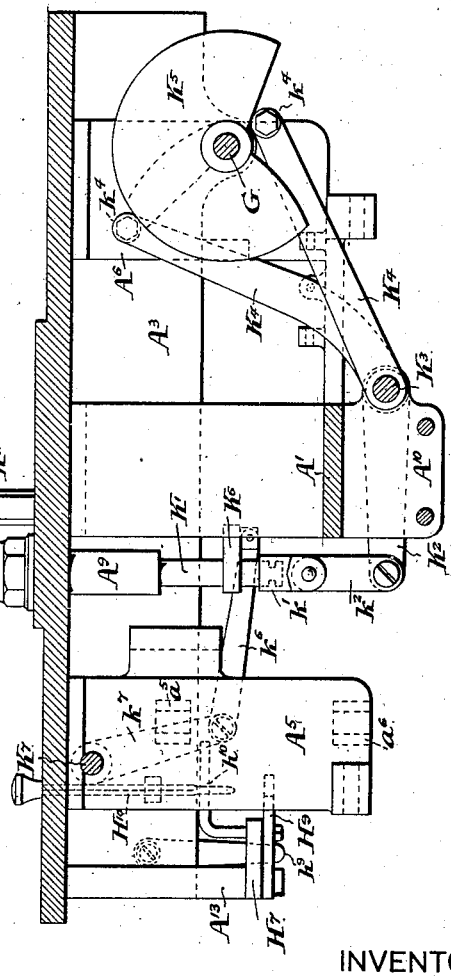
WITNESSES:
E. L. Fullerton.
Geo. P. McArthur
INVENTOR:
WILLIAM A. DRYSDALE
By, Arthur E. Paige
Atty.

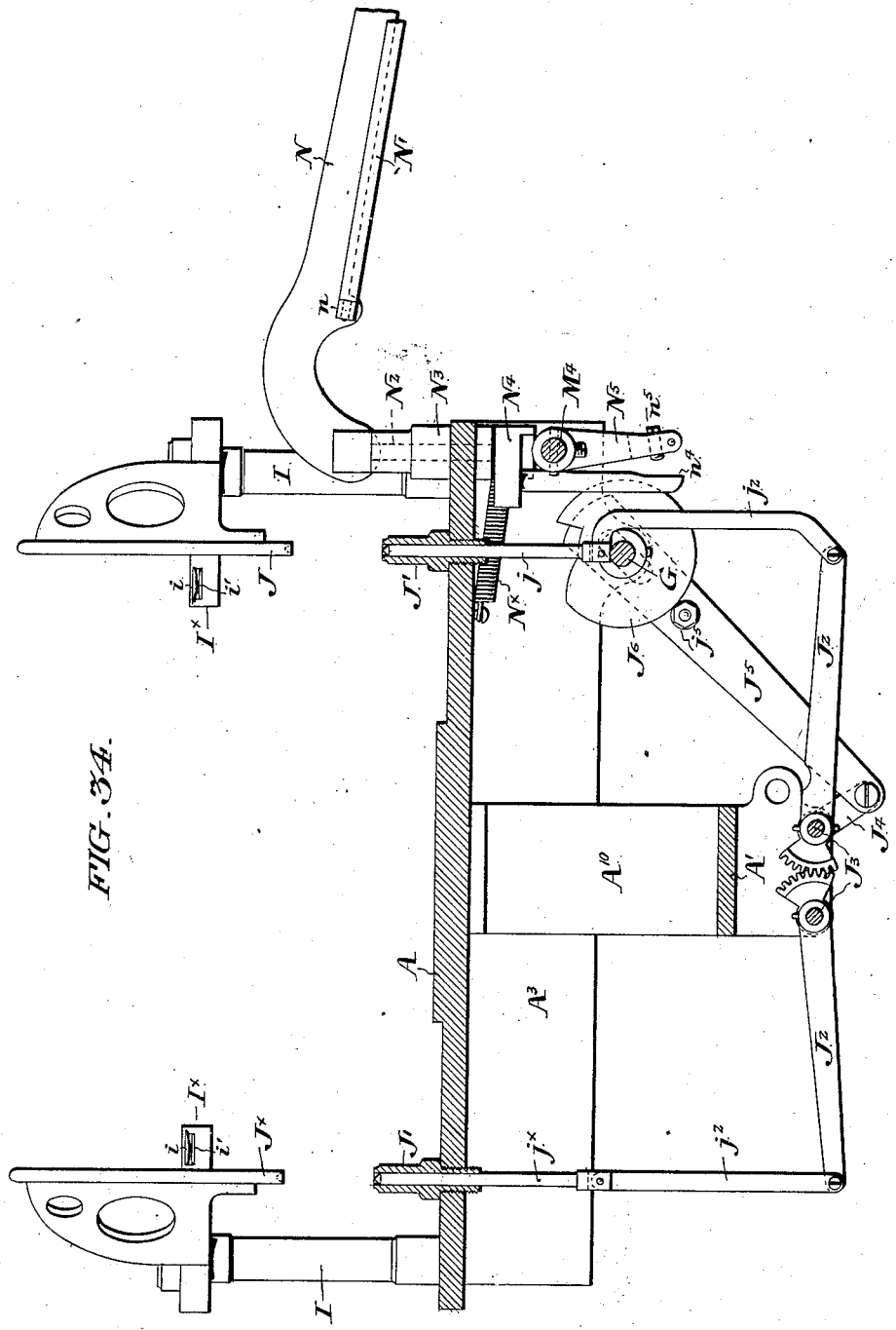

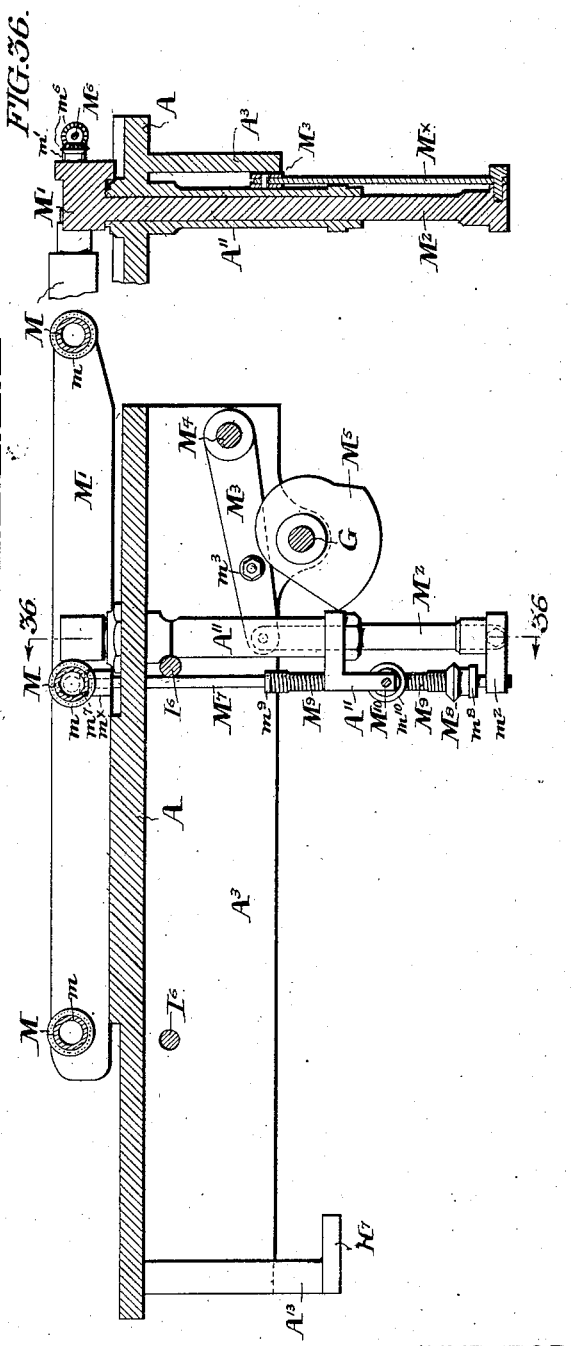

No. 728,449. PATENTED MAY 19, 1903.
W. A. DRYSDALE.
MUSIC BOX.
APPLICATION FILED FEB. 18, 1898.
NO MODEL. 17 SHEETS—SHEET 17.
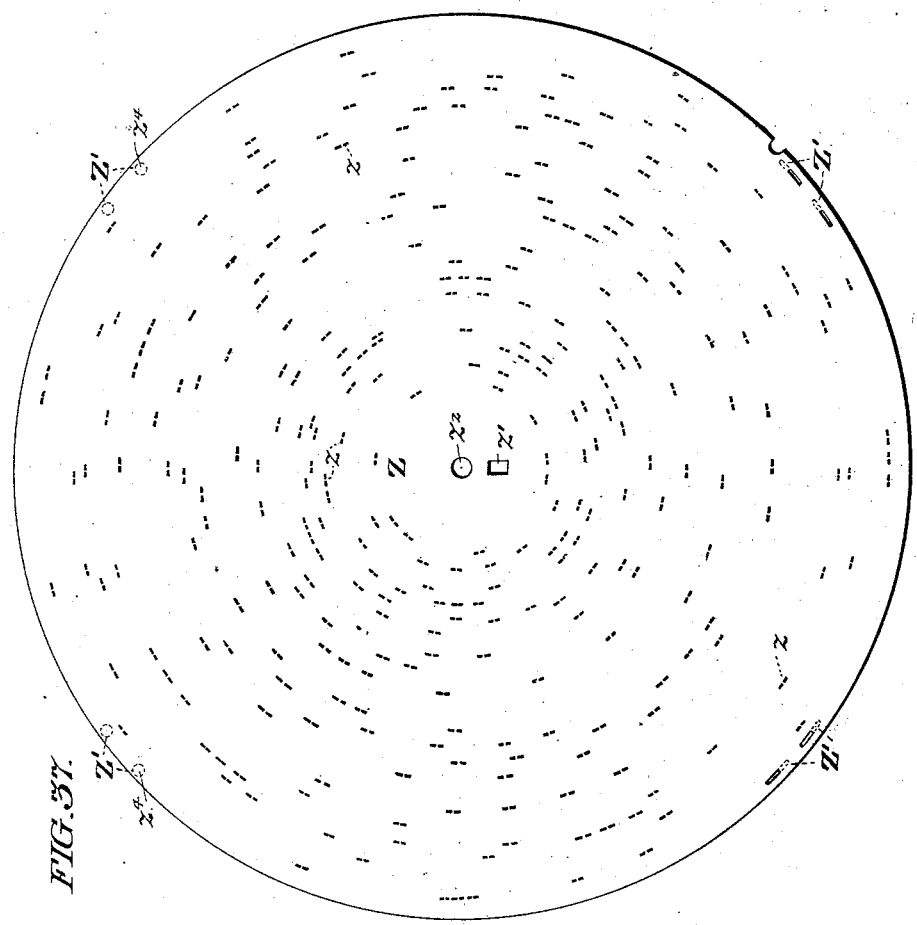
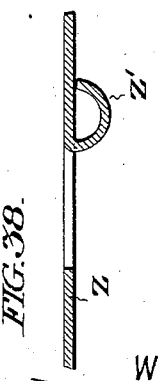
WITNESSES:
E. L. Fullerton.
Geo. P. McArthur
INVENTOR:
WILLIAM A. DRYSDALE
By Arthur E. Paige
Atty.

No. 728,449. Patented May 19, 1903.

UNITED STATES PATENT OFFICE.

WILLIAM A. DRYSDALE, OF PHILADELPHIA, PENNSYLVANIA.

MUSIC-BOX.

SPECIFICATION forming part of Letters Patent No. 728,449, dated May 19, 1903.

Application filed February 18, 1898. Serial No. 670,771. (No model.)

*To all whom it may concern:*

Be it known that I, WILLIAM A. DRYSDALE, of Philadelphia, in the State of Pennsylvania, have invented certain new and useful Improvements in Music-Boxes, whereof the following is a specification, reference being had to the accompanying drawings.

My invention relates to machines wherein a pattern-disk is actuated to effect a predetermined operation of the machine or a predetermined sequence of sounds from sound-producing members thereof. The class of mechanism aforesaid is typified in the music-box I have illustrated, which comprises fixed combs having vibratory sounding-tongues and mechanism to rotate a removable disk, the latter being provided with pattern perforations or projections upon its face so related to said tongues as to effect the vibration thereof during the rotative traverse of the disk.

Music-boxes of the class illustrated as ordinarily constructed are adapted for the successive insertion and removal of single disks which are temporarily maintained in proper relation with the rotary mechanism by a central clamp fixed upon the extremity of an arm overhanging the disk, said arm being hinged at its outer extremity upon the frame of the instrument and manually operated to effect the insertion and removal of each disk.

My present invention comprises means whereby a series or pack of disks may be simultaneously placed in a machine which in operating will successively feed the disks of said series upon the rotary mechanism and rotate and discharge each disk in succession at predetermined intervals without further attendance of the operator.

My invention also comprehends controlling mechanism whereby the number of revolutions of each disk may be varied, being predetermined at the will of the operator, conveniently by the set of an index.

Figure 2:
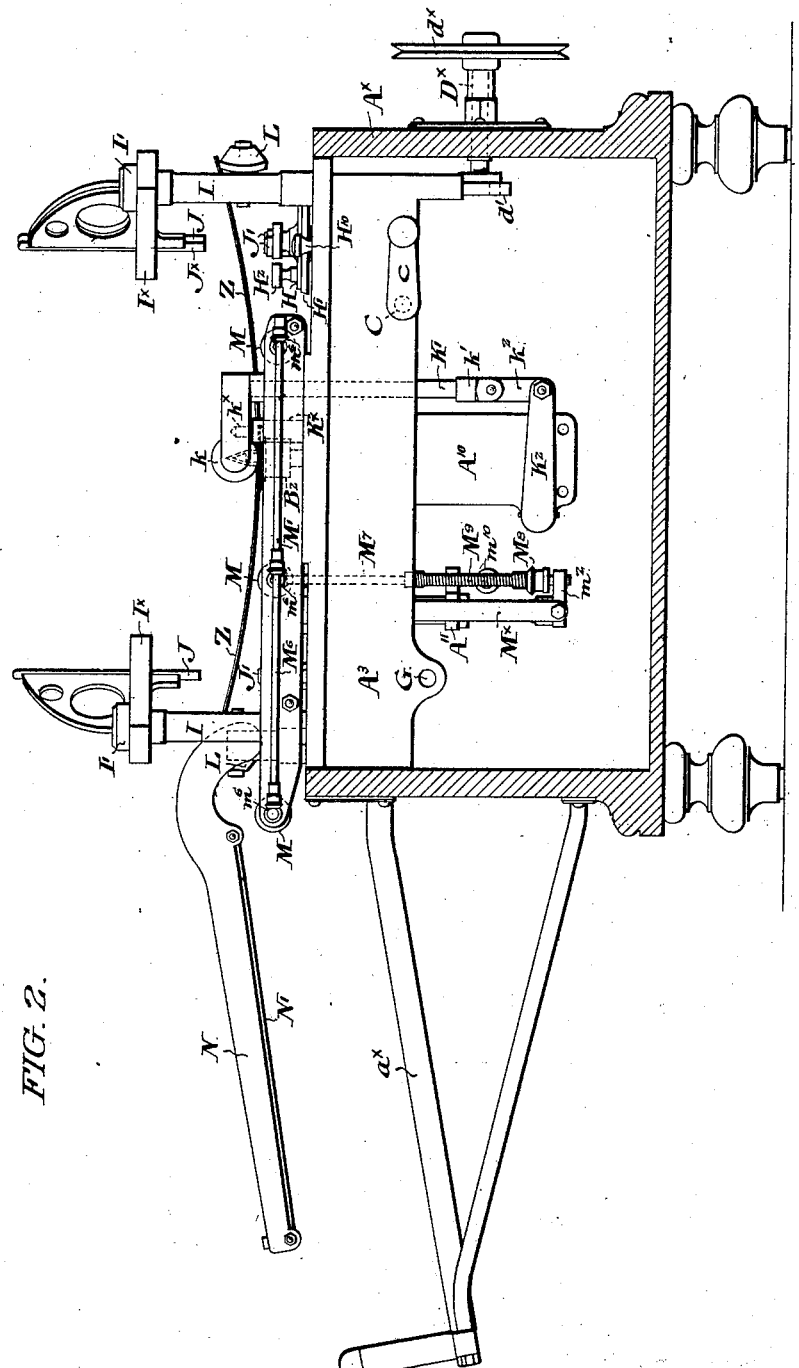
Figure 3:
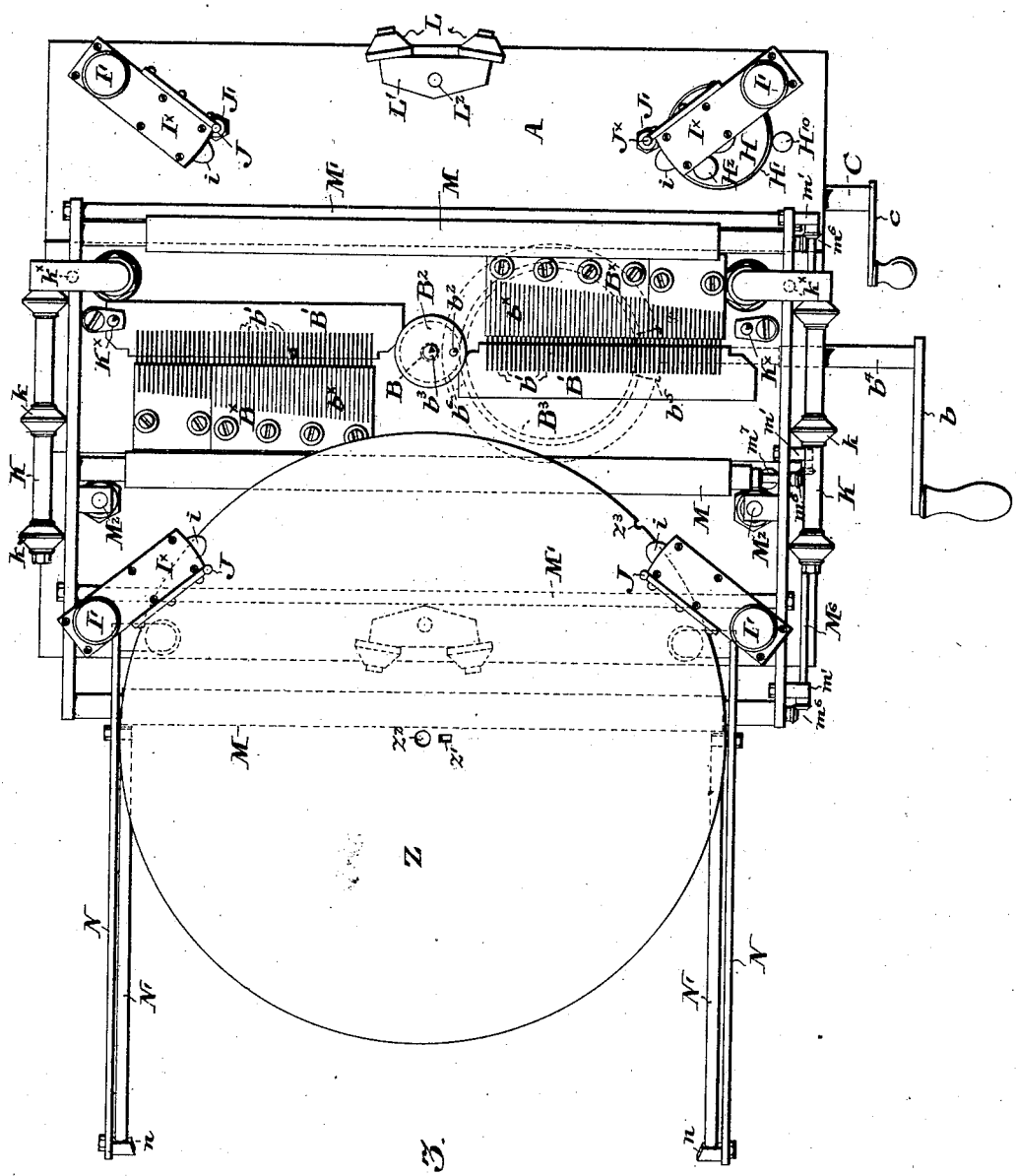
Figure 4:
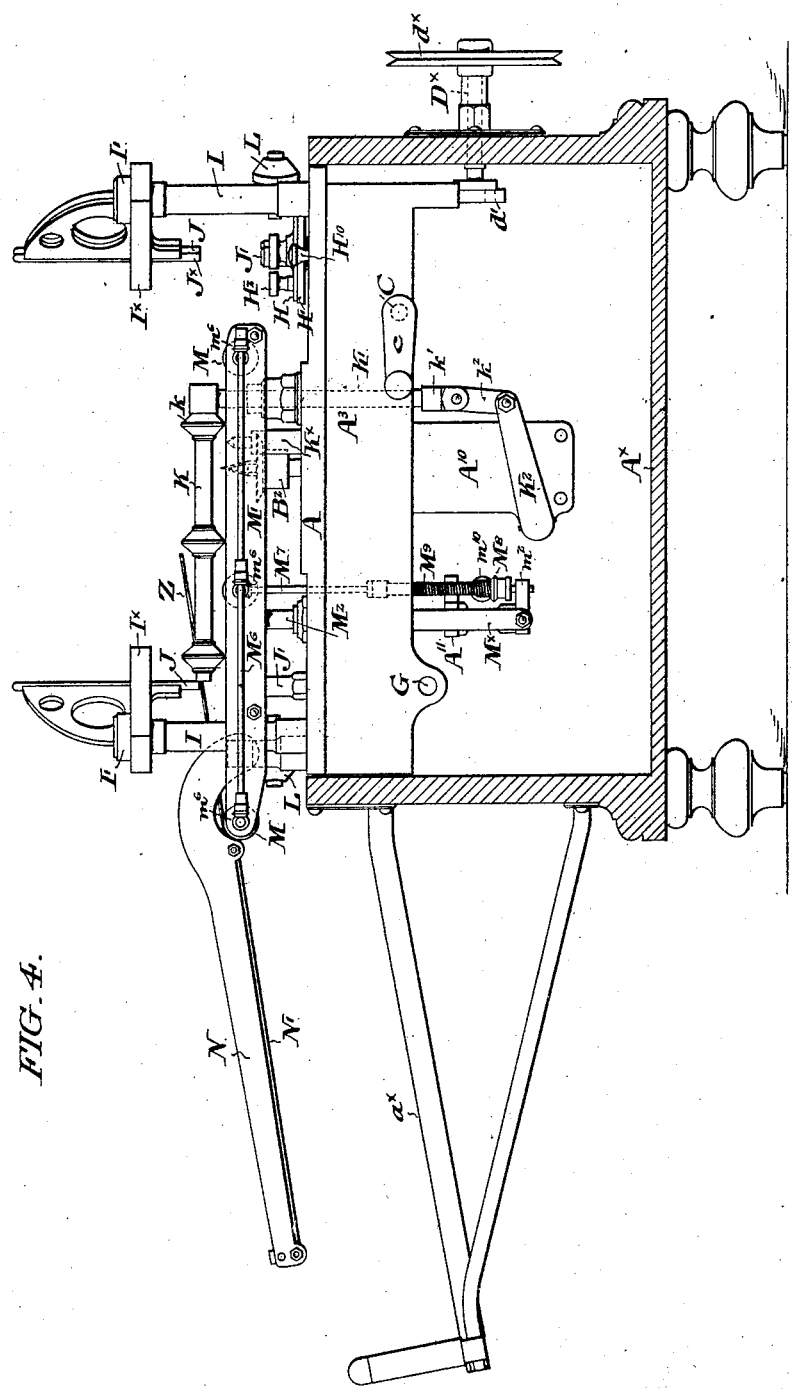
Figure 5:
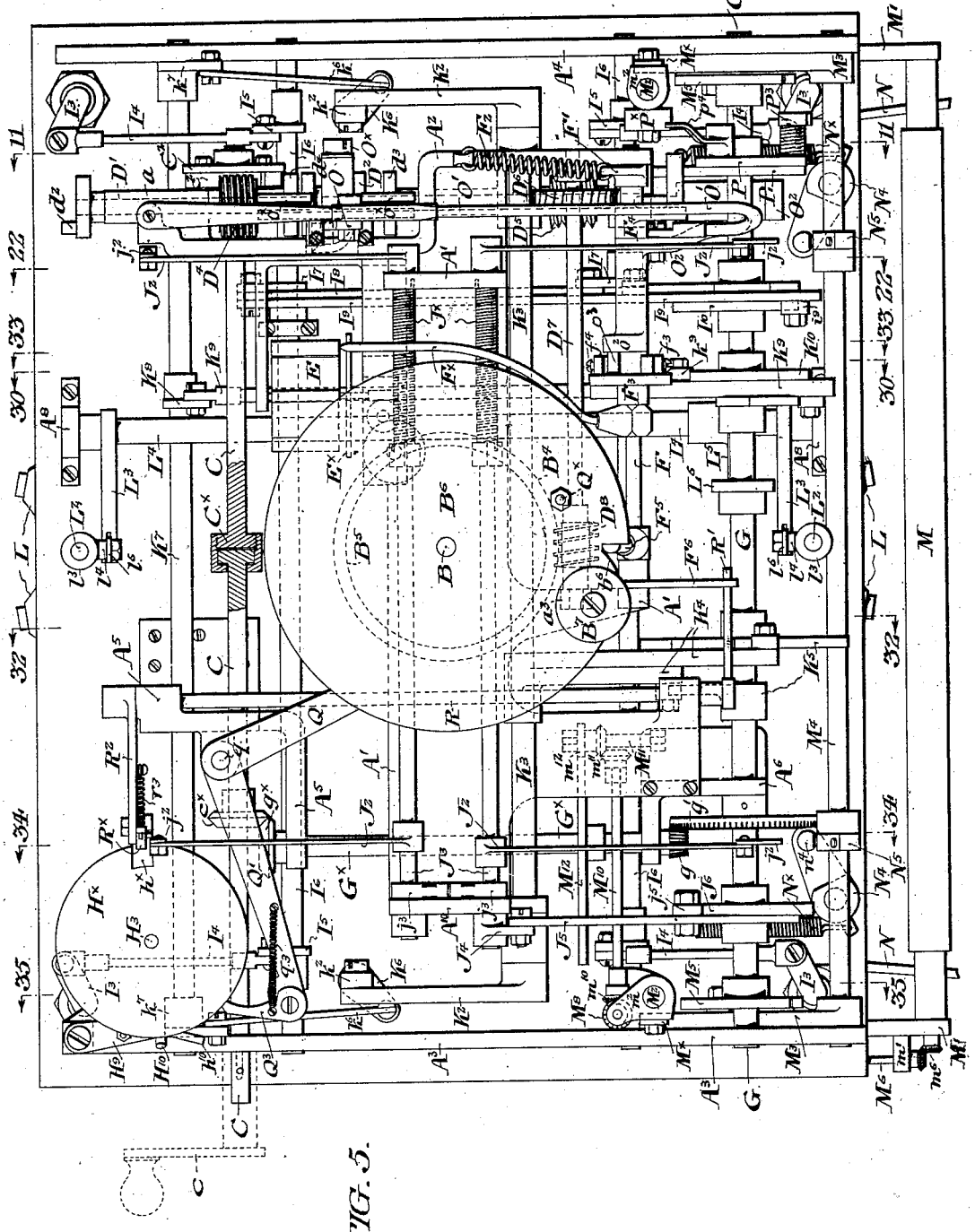
Figure 7:
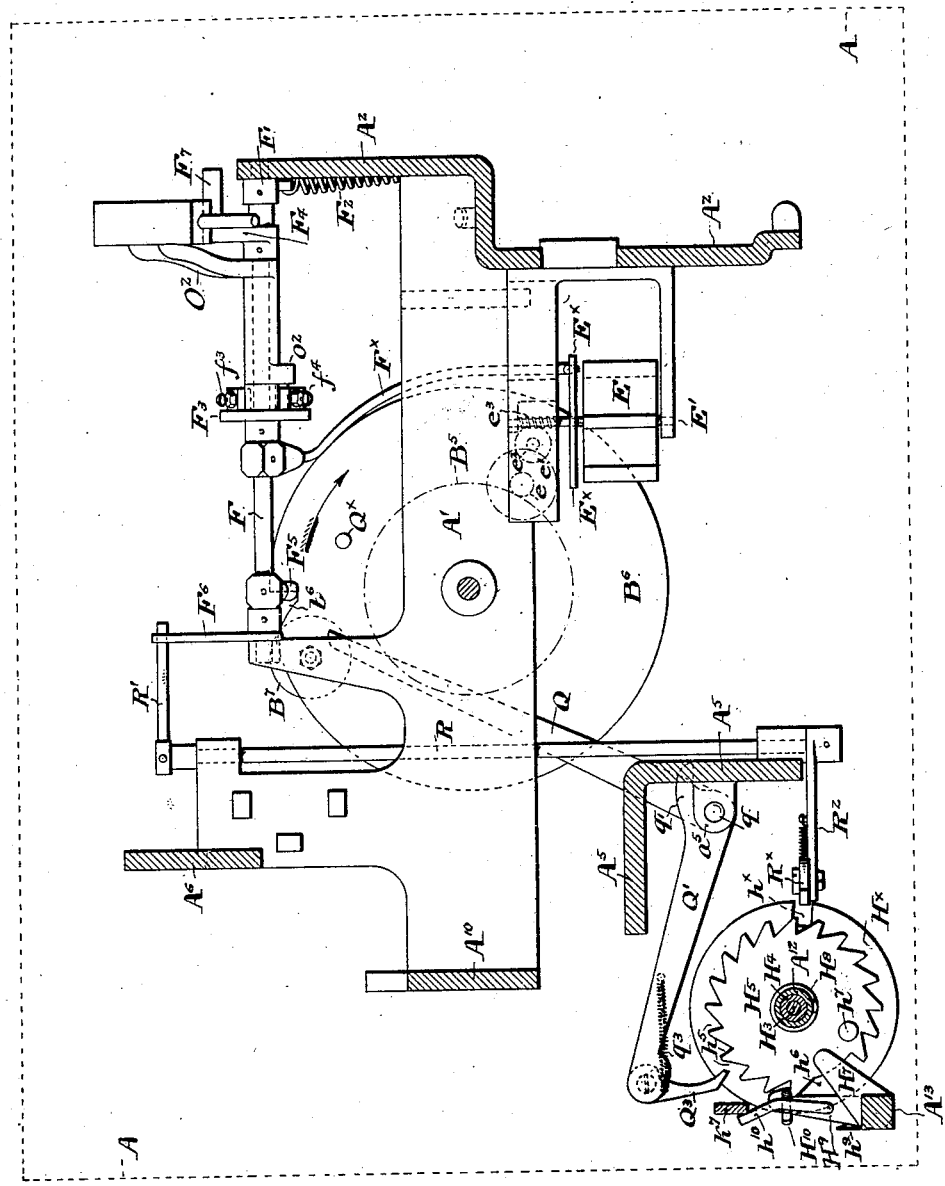

In the drawings, Figure 1 is a plan view of a machine conveniently embodying my invention, the parts being in position to begin rotation of the pattern-disk. Fig. 2 is a side elevation of the machine in its casing, the latter being shown in section for clearness of illustration. Fig. 3 is a plan view of the machine, showing the position of the parts during the discharge of a pattern-disk. Fig. 4 is a side elevation similar to that of Fig. 2, the position of the parts being that of Fig. 3. Fig. 5 is an inverted plan view of the machine removed from its casing. Fig. 6 is a rear elevation of the machine, certain parts being omitted for clearness of illustration. Fig. 7 is a plan sectional view of the machine, showing the controlling mechanism by which the number of revolutions of each pattern-disk is predetermined. Fig. 8 is a vertical sectional view on the axial line of the controller-dial. Fig. 9 is a plan view of the controller-dial. Fig. 10 is a sectional view showing the locking-plunger of the controller-dial. Fig. 11 is a sectional view taken on the line 11 11 in Fig. 5 in the direction of the arrows upon said line. Fig. 12 is a sectional view taken on the line 12 12 of Fig. 11 in the direction of the arrows upon said line. Fig. 13 is a sectional detail view of the motor-shaft and parts connected therewith. Fig. 14 is a sectional detail view of the clutch worm-gear upon the extremity of the main driving-shaft. Fig. 15 is a fragmentary sectional view taken transversely of Fig. 5 in the same direction as Fig. 11, showing the details of the clutch-shifting mechanism with the parts in the position initial to the operation of the disk-transferring mechanism. Fig. 16 is a detail view showing the position of the parts of the tripping-cam when automatically set for operation. Fig. 17 shows the position of the parts of the tripping-cam about to actuate the clutch-shifting mechanism to stop the disk-transferring mechanism and start the disk-rotating mechanism. Fig. 18 is a view similar to that of Fig. 15, showing the position of the parts initial to the operation of the disk-rotating mechanism. Fig. 19 is an elevation of the tripping-cam, showing the opposite side to that of Fig. 16. Fig. 20 is an edge view of the tripping-cam, as seen from the right-hand side of Fig. 16. Fig. 21 is an edge view of the tripping-cam, being the lower edge of Fig. 16. Fig. 22 is a sectional view taken on the line 22 22 in Fig. 5 in the direction of the arrows upon said line, showing the disk-lowering mechanism. Fig. 23 is a fragmentary plan view showing one of the disk-supporting heads. Fig. 24 is a fragmentary plan view similar to Fig. 23 with the cap-plate of said head removed. Fig. 25 is an enlarged sectional view taken on the line 25 25 in Fig. 23 in the direction of the arrows upon said line, showing the normal position of the disk supporting and releasing blades. Figs. 26, 27, and 28 are respectively detail plan views of the lower blade, the partition-strip, and the upper blade, shown assembled in Fig. 24. Fig. 29 is a detail view showing modified means for supporting and releasing the disks. Fig. 30 is a sectional view taken on the line 30 30 in Fig. 5 in the direction of the arrows upon said line, showing the disk-bearing rollers and the mechanism by which they are vertically reciprocated. Fig. 31 is a fragmentary elevation of the parts shown at the right-hand side of Fig. 30. Fig. 32 is a sectional view taken on the line 32 32 in Fig. 5 in the direction of the arrows upon said line, showing the mechanism for vertically reciprocating the clamp-shafts. Fig. 33 is a detail view of the cam and connected parts by which the clamp-shafts are horizontally oscillated from their normal position shown in Fig. 1 to the position shown in Fig. 3. Fig. 34 is a sectional view taken on the line 34 34 in Fig. 5 in the direction of the arrows upon said line, showing the vertical reciprocatory disk guide-rods, the track-arms from which the pattern-disks are discharged, &c. Fig. 35 is a sectional view taken on the line 35 35 in Fig. 5 in the direction of the arrows upon said line, showing the disk-discharging mechanism. Fig. 36 is a sectional view taken on the line 36 36 in Fig. 35 in the direction of the arrows upon said line. Fig. 37 is a plan view of a typical form of disk peculiarly adapted to coöperate with my improved mechanism. Figs. 38 and 39 are sectional views of supporting-bosses upon said disk, the former showing the preferred form.

Referring to the drawings, $A^\times$ is an inclosing casing which serves to conveniently support the bed-frame plate A and its depending frame $A'$, &c., upon and between which are mounted the ordinary elements of the musical instrument and the mechanism comprising a convenient embodiment of my invention.

The ordinary elements of the instrument aforesaid comprise fixed combs $B^\times$, the vibratory tongues $b^\times$ of which differ in length, &c., in accordance with the sound-pitch they are designed to produce. Each of said tongues is provided with an idle spur-wheel $b'$, mounted for rotation in the bearing-blocks $B'$. Said spur-wheels $b'$ project above said bearing-blocks to engage projections $z$ upon the rotary pattern-disk Z. Said disk Z is rotated by its detachable engagement upon the shaft B, the latter having a disk-driving head $B^2$, provided with an eccentric driving-pin $b^2$, and a central cone-pin $b^3$. Said pins fit respective apertures $z'$ and $z^2$ in the disk Z, which is thus centered and rotatively engaged.

The pattern upon each disk Z being formed by the projections $z$ upon its lower surface existing at intervals in concentric circles in registry with the respective idle spur-wheel $b'$, it is obvious that when said disk is rotated by its engagement, as aforesaid, said projections $z$ contact with the respective idle spur-wheels $b'$ and through the latter vibrate the respective tongues $b^\times$ of the sounding-combs $B^\times$ in a sequence predetermined by the relative position of said projections $z$.

The shaft B may be rotated in the direction of the arrow upon Fig. 1 by any suitable actuating mechanism. As ordinarily constructed, however, said actuating mechanism comprises a spring-motor $B^3$, (see Fig. 3,) the spring being adapted to be wound by means of the exterior handle $b$ upon the shaft $b^4$, the latter connecting with the spring-drum by the bevel-gears $b^5$. Said drum imparts its unwinding motion of rotation to said shaft B by the gears $b^6$.

The embodiment of my invention which I have shown comprises a main shaft C, from which the various associated devices comprising my invention are actuated. A simple form of my invention would therefore consist of said devices connected with said shaft C and entirely separate from the motor which effects the rotation of the disk, but mounted upon the bed-plate A in such relation with said ordinary elements of the instrument as to coöperate therewith to feed and discharge the disks. In such an embodiment of my invention the shaft C may be manually actuated at the proper intervals by means of the exterior handle $c$.

The dimensions of a motor of the spring type above described are necessarily such as to limit the time of its unwinding operation to a few minutes, thus necessitating the frequent manipulation of the winding-handle $b$. Therefore the preferred embodiment of my invention comprises a motor-shaft $D^\times$, provided with a band-wheel $d^\times$, exterior to the casing $A^\times$, so that it may receive continuous rotary motion from some exterior source, such as an electric motor. In said preferred form of my invention the parts are so related that the respective shafts B and C may be alternately actuated from said motor-shaft $D^\times$ by means of an automatically-operative clutch mechanism, so that the continuous rotary motion of the exterior band-wheel $d^\times$ through the shaft C, &c., effect the transference of the disks Z at the proper intervals and through the shaft B, &c., effects the successive rotation of said disks at the proper intervals, the relation of said intervals of disk rotation and disk transference being controlled, as aforesaid, by a manually-adjustable index H, hereinafter at length described. Said shaft $D^\times$ extends through the casing $A^\times$ and is provided with a clutch member $d'$, adapted for fixed engagement with the clutch member $d^2$ upon the shaft $D'$ when the mechanism is in its normal position within said casing. The two shafts being thus normally continuous are separable, as aforesaid, merely for convenience of removal of the mechanism from the casing.

Referring to Figs. 11, 12, 13, and 14, the shaft D' is mounted in the bearing $a$ in the frame member $A^2$, depending from the bed-plate A, and is provided with a coupling-sleeve $D^2$, keyed for endwise reciprocation thereon to alternately engage with the clutch-head $d^3$ of the disk-rotating mechanism and the clutch-head $d^4$ of the disk-transferring mechanism. The head $d^3$ is fixed upon the shaft $D^3$ and is shaped to receive the extremity of the shaft D', which is supported for rotation therein independently of said shaft $D^3$, the latter being mounted for rotation in the bearings $a'$ $a'$ in said frame member $A^2$. The clutch $d^4$ is loosely mounted upon the shaft D' and provided with a worm $D^4$ in mesh with the worm-gear C' upon the shaft C. Said worm-gear C' is loosely mounted upon the shaft C, but is adapted to rotate the latter in the direction of the arrow upon Fig. 11 by the engagement of the ratchet $c'$ upon the gear with the pawl $c^2$, pivoted upon the plate $C^2$, fixed upon said shaft. Said ratchet permits the transferring mechanism to be manually operated forwardly by the handle $c$. (See Fig. 5.) I prefer, however, to fix the gear C' upon the shaft C and make the latter in two parts connected for actuation by the gear C', &c., through the friction union $C^\times$ to permit the manual rotation of said mechanism in either direction without disturbing the relation of said gear C' with the driving-worm $D^4$, fixed upon the shaft D'. The worm $D^5$ is fixed upon the shaft $D^3$ and engages with the worm-gear $D^6$, fixed upon the shaft $D^7$. Said shaft $D^7$ is mounted for rotation in the bearing $a^2$ in the frame member $A^2$ and in the bearing $a^3$ upon the frame member A'. The worm $D^8$ is fixed upon said shaft $D^7$ in position to engage the worm-gear $B^4$, fixed upon the shaft B. It is therefore obvious that when the clutch-sleeve $D^2$ is engaged with the clutch-head $d^3$ the rotary motion of the shafts $D^\times$ D' is transmitted to said shaft B and through its driving-head $B^2$ to the disk Z, seated thereon.

As is usual in mechanism of this class, the speed of rotation of the shaft B may be governed within certain limits by the fan E, the gear-wheel $B^5$ upon said shaft B being operatively connected with said fan E through gears $e$, $e'$, and $e^2$, the latter being engaged with the worm $e^3$ upon the arbor E' of the fan. The detent-arms $E^\times$ are fixed upon the fan-arbor E' and serve to contact with the detent-lever $F^\times$, by which the motion of said fan and its train aforesaid is arrested at the proper intervals, as hereinafter described.

Before describing the detailed construction of the parts comprising the disk-transferring mechanism operated by the main driving-shaft C, I shall describe the general arrangement and coöperative relationship of said respective parts, as follows: The standards I, existing in the four corners of the rectangular bed-plate A, conveniently support a series of the disks Z in readiness for successive transference to the rotary head $B^2$. Said standards have fixed heads $I^\times$, each provided with a pair of movable blades $i$ $i'$, adapted, as hereinafter described, to successively release each disk at the bottom of the series or pack which rests upon said blades, the pack of disks being laterally supported by the fixed guide-bars J $J^\times$. The disks Z must be maintained, as shown in Fig. 1, with their apertures Z' in registry with the driving-pin $b^2$ upon the driving-head $B^2$, so that when released, as aforesaid, they will descend in proper position with respect to said driving-head and said pin. I have therefore provided each of said disks with a single peripheral notch $z^3$, adapted to engage the guide $J^\times$, which is set within the circumferential line bounded by the other guides J. Said disks are therefore maintained in proper registry, and it is impossible to otherwise place them upon the standards I. When a disk Z is dropped upon the driving-head $B^2$, the clamp-shafts K, provided with the idle rollers $k$, serve to retain said disk in proper position relative to the spur-wheels $b'$, &c. The disk-bearing rollers L serve to upwardly deflect the disk Z, engaged upon the head $B^2$ beneath the idle rollers $k$. The disk Z is thus stiffened for engagement with the spur-wheels $b'$ and prevented from chattering during its rotary movement.

During the operation of discharging the disk Z, as shown in Figs. 3 and 4, the rollers L are lowered, the disk being uplifted by the discharging-rollers M, mounted for rotation in the frame M', said rollers serving to deliver the disk upon the track-arms N N, which are maintained parallel until said disk has been fully discharged upon them, being then diverged, as shown in Fig. 1, dropping the disk upon the disk-rack $a^\times$, fixed upon the exterior of the casing $A^\times$.

The main driving-shaft C of the disk-transferring mechanism is provided with the bevel-gear $c^\times$, in mesh with the bevel-gear $g^\times$ upon the shaft $G^\times$, mounted for rotation in the frame members $A^5$ $A^6$. The bevel-gear $g$ upon the opposite extremity of the shaft $G^\times$ is in mesh with the bevel-gear $g'$, fixed upon the cam-shaft G. Said shaft G is mounted for rotation in the frame members $A^3$ $A^4$ and is provided with cams to actuate the respective members of the disk-transferring mechanism, as follows: I shall first describe the details of construction of the standards I and the blades by which said disks Z are normally supported and successively dropped upon the driving-head, referring particularly to Figs. 22 to 28. Each of the heads $I^\times$ incloses disk-releasing blades $i$ $i'$, adapted for reciprocation beneath the disks Z. Said blades $i$ $i'$ are separated in their respective heads $I^\times$ by the diaphragms $i^\times$ and are provided with oppositely-disposed notches $i^2$ $i^3$, respectively, for engagement with the respective crank-pins $i^4$ $i^5$ upon the crowns I', fixed on the vertical rock-shafts $I^2$. The latter extend through the standards I and are provided upon their respective lower extremities with crank-arms $I^3$. It is obvious that rocking movement of the shafts $I^2$ serves to oppositely reciprocate the blades $i$ $i'$ in accordance with the direction of said movement.

In operation the blades $i$ serve to sustain the pack of disks placed within the guides J $J^\times$, the initial movement of their operation being the simultaneous withdrawal of the upper blades $i$ and advance of the lower blades $i'$. When the blades $i$ are withdrawn, the pack of disks settles upon the blades $i'$, and the blades $i$ are then reëntered above the single bottom disk, the latter being in the sequence of operation released and allowed to fall by the withdrawal of the blades $i'$. To facilitate the aforesaid operation of the blades $i$ $i'$, I prefer to maintain the disks Z slightly separated in the pack upon the standards I by bosses $Z'$, formed on each disk by curled tongues struck from the disk metal. (See Figs. 37 and 38.) Said bosses are located in the region of the standards I, conveniently projecting from the lower surface of the disk Z of height equal to the pattern projections $z$. As shown in Fig. 39, said bosses may be formed by depressions in the disks filled flush with the disk-surface, as indicated at $z^4$ in said figure. The four crank-arms $I^3$ are respectively connected by links $I^4$ with crank-arms $I^5$, fixed upon the shafts $I^6$. The crank-arms $I^7$ are respectively fixed upon the shafts $I^6$ and are coupled by the link $I^8$. It is obvious that said crank-arms $I^3$ are thus adapted for simultaneous movement, and said arms are actuated to effect the aforesaid simultaneous movements of the blades $i$ $i'$ by means of the pitman $I^9$, which has a bearing upon the shaft G and is actuated at the proper intervals by the cam $I^{10}$, fixed upon said shaft G to engage with the roller $i^9$ upon said pitman $I^9$. The vertical guide-bars J terminate above the driving-head $B^2$ to permit the lateral discharge of the disks after their rotation. It is desirable, however, that said disks should be positively guided into position upon the driving-head $B^2$ when released by the blades $i'$. I therefore provide reciprocatory vertical guide-rods $j$ and $j^\times$, which respectively register with the fixed guide-bars J and $J^\times$, but are normally lowered within the sockets $J'$ upon the bed-plate A. (See Fig. 34.) The links $j^2$ connect said rods with the crank-arms $J^2$ upon the rock-shafts $J^3$, which are mounted in the framework $A'$ and connected by the sectors $j^3$ for simultaneous actuation. The pitman $J^5$ is pivoted to the crank-arm $J^4$, fixed on $J^3$, and is provided with rollers $j^5$ to engage the cam $J^6$, fixed upon the shaft G. At the proper intervals said rods are raised by said cam and lowered by the springs $J^\times$, the extremities of the latter being respectively fixed upon the frame $A'$ and the shafts $J^8$. (See Fig. 5.) The conical rollers L, which flex the disk Z, are preferably of the form shown at the left-hand side of Fig. 30 and are mounted for idle rotation upon the yokes $L'$ on the vertical plungers $L^2$. The latter being mounted for vertical reciprocation in the fixed bearing-sleeves $A^7$, depending from the bed-plate A, are maintained in proper position radial to the head $B^2$ by means of the splines $l^2$, fixed upon the plungers and engaged in the slideways $a^7$ in the bearings $A^7$. The collars $l^3$ are fixed upon the respective lower extremities of said plungers $L^2$ and provided with studs $l^4$, upon which are pivotally mounted the links $l^6$, which connect said collars with the arms $L^3$ upon the rock-shaft $L^4$. Said shaft is mounted for rotation in bearings $A^8$, depending from the bed-plate A, and is conveniently rocked to raise and lower the rollers L at the proper intervals by means of the crank-arm $L^5$, the roller $l^5$ upon the extremity of said arm bearing upon the cam $L^6$, fixed upon the shaft G. (See Fig. 31.) The clamp-shafts K normally overhang the disk Z upon the driving-head $B^2$, as shown in Figs. 1 and 2, the idle rollers $k$ clamping said disk in proper relation with the driving-head $B^2$. Said shafts are mounted upon vertical plungers $K'$, which are adapted to reciprocate and rotate in the bearing-sleeves $A^9$, depending from the bed-plate A. The dowel-pins $K^\times$, fixed upon the plate A, project within the sockets $k^\times$ of the shafts K and prevent the displacement of the latter during the operation of the disk-rotating mechanism. In order to free the disk Z from its engagement beneath the rollers $k$, said shafts K are raised and swung into the position shown in dotted lines in Fig. 32 and in full lines in Fig. 3. The plungers $K'$ are raised and lowered by means of the collars $k'$, swiveled upon their lower extremities, the latter being connected by the links $k^2$ with the crank-arms $K^2$, fixed upon the shaft $K^3$. Said shaft $K^3$ is mounted for rotation in the vertical frame members $A^2$ and $A^{10}$, and the double-crank arm $K^4$, fixed thereon, is provided with rollers $k^4$, adapted to contact with the opposite sides of the cam $K^5$ upon the shaft G. Said cam $K^5$ is shaped to vertically reciprocate the plungers $K'$ at the proper intervals. The crank-arms $K^6$ are respectively fixed upon the lower extremities of the plungers $K'$ and connected by the links $k^6$ with the crank-arms $k^7$, fixed upon the rock-shaft $K^7$. The latter is mounted to rotate in the frame members $A^2$ $A^3$ $A^4$ $A^5$ and is provided with a fixed crank-arm $K^8$, pivotally connected with the pitman $K^9$. Said pitman is supported at its opposite extremity upon the shaft G and is provided with rollers $k^9$ to engage the opposite sides of the cam $K^{10}$. Said cam $K^{10}$ is so shaped as to rock said shaft $K^7$, and thereby swing the clamp-shafts K in proper time with the other parts of the mechanism. The discharging-rollers M, which uplift the disk Z when the latter is disengaged from the rollers $k$ upon the clamp-shafts K, are mounted for rotation in the frame $M'$, fixed upon the plungers $M^2$. Said plungers are mounted for vertical reciprocation in the bearing-sleeves $A^{11}$, depending from the bed-plate A, (see Fig. 36,) and are raised and lowered by means of links $M^\times$, which pivotally connect the lower extremities of the plungers with the extremities of the crank-arms $M^3$. Said arms $M^3$ are fixed upon the shaft $M^4$ and are each provided with a roller $m^3$, adapted to contact with the cam $M^5$ upon the shaft G. Said cam is so proportioned as to raise and lower the frame $M'$ at the proper intervals. Said rollers M are preferably faced with rubber, as indicated at $m$ in Fig. 35, and are connected for simultaneous rotation by means of the shaft $M^6$ and the bevel-gears $m^6$. The central roller M is rotated by the vertical shaft $M^7$ and the bevel-gears $m^7$. (See Figs. 1 and 35.) Said shaft $M^7$ is mounted for rotation in the bearings $m^\times$ and $m^{3'}$ upon the frame $M'$ and the plunger $M^2$, respectively, and is of course raised and lowered therewith. The shaft $M^7$ is provided at its lower extremity with a bevel-gear $M^8$, which is not, however, rigidly connected therewith. Said gear $M^8$ rests upon the collar $m^8$, fixed upon said shaft, and is rotatively connected with the latter by the spiral spring $M^9$, one end of which is fixed upon the gear and the other end upon the shaft at the collar $m^9$. Said bevel-gear $M^8$ is adapted to mesh with the bevel-gear $m^{10}$, fixed upon the extremity of the shaft $M^{10}$, the latter being mounted for rotation in the frame members $A^{11}$ and $A^6$. (See Fig. 5.) The shaft $M^{10}$ is continuously rotated during the operation of the disk-changing mechanism, but is only in mesh with the gear $M^8$ to rotate the discharging-rollers M when the latter are in their upper position, and the resilient connection of said gear $M^8$ upon the shaft $M^7$ above described, prevents injury to the parts by the instantaneous engagement of the bevel-gears $M^8$ and $m^{10}$ when said rollers M are uplifted, as aforesaid. Said shaft $M^{10}$ receives its motion of continuous rotation through the bevel-gears $m^{11}$, one of which is fixed upon the shaft $M^{11}$, the gear-pinion $m^{12}$ being fixed upon the shaft $M^{11}$ in mesh with the gear-wheel $M^{12}$, fixed upon the shaft $G^\times$, driven from the shaft C, as hereinbefore described. The rollers M discharge the disk Z upon the track-arms N, as shown in Fig. 3. Said arms comprise the roller-tracks $N'$, mounted for idle rotation in the bearings $n$ upon said arms. During the operation of the disk-rotating mechanism said arms remain in the divergent position indicated in Fig. 1, and their only movement is from that position to the parallel position shown in Fig. 3. Said track-arms remain parallel until the discharged disk has slid out thereon to the proper position to be dropped upon the supporting-rack $a^\times$, whereupon they diverge to their normal position, releasing said disk, which drops between them, the escape of the disk being facilitated by the rotary movement of the tracks $N'$. As shown in Figs. 1 and 34, said arms N are fixed upon the vertical rock-shafts $N^2$, which are mounted in the bearings $N^3$ in the bed-plate A. The crank-arms $N^4$, fixed upon the lower extremities of said shafts, are provided with springs $N^\times$, which tend to diverge the arms N. The tappet-arms $N^5$ being fixed upon the rock-shaft $M^4$, hereinbefore described, are provided with tappets $n^5$, adapted to contact with the studs $n^4$ upon the arm $N^4$ and coöperate with said springs $N^\times$ to swing the arms N at the proper intervals. As thus described, the disk-transferring mechanism is independent of the disk-rotating mechanism, and either of said mechanisms may be actuated from the motor-shaft $D'$ in accordance with the engagement of the clutch-sleeve $D^2$ with the head $d^3$ of the disk-rotating mechanism or the head $d^4$ of the disk-transferring mechanism. I have, however, provided clutch-shifting mechanism connective of the two mechanisms aforesaid, whereby the last operation of the disk-rotating mechanism automatically initiates the operation of the disk-transferring mechanism, and vice versa.

It is obvious that the mere disconnection of the clutch $D^2$ from either of the heads $d^3$ or $d^4$ would not suffice to instantly terminate the movement of the mechanism connected therewith. In order, therefore, to start and stop the respective mechanisms with precision, I have provided means to arrest the movement of the disengaged mechanism simultaneously with the shifting movement of the clutch $D^2$, as follows: Referring to Fig. 11, O is the clutch-shifting lever, mounted for oscillatory movement upon the stud $O^\times$, fixed in the frame member $A^2$. The brake-blocks $o^\times$ are secured upon the wings $o$ of the lever O and adapted to alternately impinge upon flanges of the respective clutch-heads $d^3$ and $d^4$, so that when the clutch-sleeve $D^2$ is thrust into engagement with one of said heads the other of said heads is engaged by its respective brake-block. Said brake-blocks $o^\times$ are conveniently made of leather or similar material, and the screw-tappets $o'$ upon the wings $o$ of the lever O contact with the frame member $A^2$ to limit the movement of the brake-blocks against said heads. The lever O being connected by the curved link $O'$ with the weighted lever $O^2$, which is loosely mounted upon the rock-shaft F, the weight of said lever $O^2$ serves to press the brake-blocks $o^\times$ against said heads $d^3$ and $d^4$ in accordance with the position of said lever $O^2$ upon one side or the other of the center of its oscillation upon the shaft F. The shaft F is mounted for rotation in the frame members $A'$ and $A^2$. (See Figs. 5 and 7.) The detent-lever $F^\times$ and the crank-arm $F'$ being fixed upon said shaft F, the spring $F^2$, which connects said crank-arm with the frame $A^2$, tends to thrust the lever $F^\times$ into the path of rotation of the detent-arms $E^\times$ upon the fan-shaft $E'$ when said lever is not withheld, as hereinafter described. The plate $F^3$ is fixed upon said shaft F and provided with adjustable screw-tappets $f^3 f^4$, which are adapted to contact with the opposite sides of the stud $o^3$ (see Fig. 15) upon the lower arm $o^2$ of the lever $O^2$ to shift the latter into one or the other of its positions aforesaid, and thus connect the motor-shaft $D'$, &c., with the disk-rotating mechanism or with the disk-transferring mechanism. Said shaft F is the connecting medium for the several mechanisms comprised in the machine and, in addition to the plate $F^3$ of the clutch-shifting mechanism, is provided with three fixed arms, which are each adapted for engagement with one of the three other mechanisms—viz., $F^4$ engages with the disk-transferring mechanism, $F^5$ with the disk-rotating mechanism, and $F^6$ with the controlling mechanism—which determines the number of revolutions of the disk-rotating mechanism, as hereinafter described.

The operation of the machine is continuous during the rotation of the motor-shaft $D'$, the weighted lever $O^2$ being shifted back and forth automatically at the proper intervals by the mechanism which I shall now describe. I shall assume, however, that the position of the parts shown in Figs. 11 and 15 is the initial position in the cycle of operation, the same being the position of the parts at the commencement of operation of the transferring mechanism. The lever $O^2$ having been thrown toward the right-hand side of said figures, the clutch-sleeve $D^2$ is engaged with the clutch-head $d^4$, and through the various connections hereinafter described the shaft G begins its rotation to effect the operation of the various members of the disk-transferring mechanism.

The cam-plate P is fixed upon the cam-shaft G, which makes a single revolution during the operation of the disk-transferring mechanism. At the completion of each revolution aforesaid the cam P shifts the arm $F^4$, fixed upon the shaft F, and through the latter engages and shifts the weighted lever $O^2$ by contact of the tappet $f^4$ with the stud $o^3$, thus disengaging the disk-transferring mechanism from the motor-shaft $D'$, &c., and engaging the disk-rotating mechanism therewith.

The cam-shaft G and cam-plate P are rotated very slowly in the aforesaid operation of disk transference. It is desirable, however, that the movement of the lever $O^2$ and clutch-sleeve $D^2$ should be practically instantaneous. I have therefore provided the tripping-cam $P'$, which is mounted for oscillation upon the cam-plate P, the fixed stud $P^2$ upon the former being entered through the latter. Upon the opposite side of the plate P said stud $P^2$ is provided with a spring $p^2$, which tends to shift said cam $P'$ with respect to the cam-plate P in the direction of the rotation of the latter, as indicated by the arrow in Fig. 15. In said Fig. 15 the cam $P'$ is in its tripped position; but during the rotation of the shaft G the arm $P^3$, which is fixed upon the stud $P^2$, encounters the roller $P^\times$, journaled upon the fixed stud $p^\times$ of the frame member $A^{11}$, and said cam $P'$ is thereby set in the position shown in Fig. 16, the lug $p'$ upon said cam $P'$ being engaged by the trip-lever $P^4$. Said lever $P^4$ rocks upon the stud $P^5$, fixed upon the cam-plate P, and being connected by the spring $P^6$ with the fixed pin $p^6$ upon said cam-plate its engagement with the lug $p'$ is automatically effected when the traverse of the latter permits the operation of the said spring. The stud $p^7$ serving as a stop to limit the movement of the lever $P^4$, the latter is maintained in engagement with the lug $p'$. Said cam-plate P continues its rotary movement with the cam $P'$, set as aforesaid, until the parts are in the position shown in Fig. 17, wherein the arm $p^4$ of the tripping-lever $P^4$ encounters said roller $P^\times$ upon the frame, whereupon further rotation of the cam-plate P serves to disengage the lever $P^4$ from the stud $p'$, and said cam $P'$ is instantly shifted by the action of the spring $p^2$ into the position shown in Fig. 18. In its movement relative to the cam-plate P the cam $P'$ strikes the lug $F^7$ upon the arm $F^4$, fixed upon the shaft F, rocking the latter, and by the impingement of the tappet $f^4$ upon the stud $o^3$ of the lower arm $o^2$ of the lever $O^2$ said lever is thrown from the position shown in Fig. 15 to the opposite extreme of its motion, as shown in Fig. 18. The detent-lever $F^\times$ being withdrawn from the detent-arms $E^\times$ by the aforesaid oscillation of the shaft F, the disk-rotating mechanism is freed simultaneously with the shifting of the clutch-sleeve $D^2$ to connect said mechanism with the motor-shaft $D'$.

The above-described movement of the clutch-sleeve $D^2$ being practically instantaneous, the momentum of the disk-transferring mechanism would progress the latter beyond its period of disconnection with the motor-shaft $D'$, &c., if means were not provided to arrest the movement of the parts. This result is in part secured by the friction of the brake-block $o^\times$ upon the clutch-head $d^4$. The action of the latter is, however, supplemented by the engagement of the projection $P^8$ of the cam $P'$ beneath the lug $F^7$, as shown in Fig. 18. The tripping-cam $P'$ being connected with the rotary cam-plate P through the spring $p^2$, the engagement of the projection $P^8$ and lug $F^7$ is resilient and the movement of the disk-transferring mechanism is arrested with precision at a predetermined instant without shock to the parts.

The cam-plate $B^6$ is fixed upon the lower extremity of the shaft B of the disk-rotating mechanism. Said plate is circular in outline and provided with a peripheral notch $b^6$, in which the arm $F^5$, fixed upon the shaft F, is seated, as hereinafter described, during the aforesaid operation of the disk-transferring mechanism. As shown in Fig. 18, however, said arm $F^5$ is withdrawn from said notch by the described operation of the cam $P'$, and while the latter is in the position shown in said figure the cam-plate $B^6$ rotates until said arm $F^5$ is encountered by the cam-roller $B^7$, fixed upon the plate $B^6$. Said roller thrusts the arm $F^5$ toward the right-hand side of Fig. 18, of course rocking the shaft F and the arm $F^4$, with which it is in fixed relation, so that the stud $F^7$ is disengaged from the projection $P^8$ of the cam $P'$, and the spring $p^2$ of the latter returns it to its initial position. (Shown in Fig. 15.) Said shaft F being thus disengaged, the spring $F^2$ would instantly return the weighted lever $O^2$ to its initial position by the contact of the tappet $f^3$ with the stud $o^3$ upon the lower arm $o^2$ of said lever if such movement of the parts were not prevented by the contact of the arm $F^5$ with the periphery of the cam-plate $B^6$, and the reverse movement of the lever $O^2$ and clutch-sleeve $D^2$, &c., is deferred until the disk-rotating mechanism has made a complete revolution in the direction of the arrow upon Fig. 7 and the notch $b^6$ is presented to said lever $F^5$, whereupon the spring $F^2$, acting on lever $F'$ and shaft F, throws the weighted lever $O^2$ into the position shown in Fig. 15. Said arm $F^5$ being thus entered in the notch $b^6$, as indicated in said figure, the operation of the disk-transferring mechanism is repeated, as above described.

From the foregoing description of the parts it is obvious that the pack of disks Z, supported by the standards I, may be successively engaged upon the driving-head $B^2$, being disengaged therefrom and discharged after an interval in which the disk-rotating mechanism imparts a single revolution to each disk by its engagement upon said driving-head. It is desirable, however, as aforesaid, that more than a single revolution may be imparted to the pattern-disk Z upon the driving-head $B^2$ at the will of the operator. I have therefore provided controlling mechanism by which the number of consecutive revolutions imparted to each disk before it is discharged by the transferring mechanism may be predetermined by the set of the index H as follows: Referring to Figs. 5 to 10, inclusive, H is an index comprising a plate-head provided with a peripheral notch $h$, adapted to disclose a single number upon the edge of the dial $H'$ beneath said plate. (See Fig. 9.) Said index H is rotatively adjustable with respect to said dial $H'$ and is provided with the locking-plunger $H^2$ and the spring $h^2$, which serves to seat said plunger in the sockets $h'$ in the dial $H'$. Said sockets are equal in number to the graduation-marks upon the edge of the dial $H'$, so that said index H may be rotated and secured with its notch $h$ in registry with any one of said marks.

In the convenient embodiment of my invention which I have shown the graduation-marks upon the dial $H'$ comprise the numerals "1" to "17," inclusive, and the letter "C." Said numerals indicate the respective number of consecutive revolutions from "1" to "17" which may be imparted to the disk upon the driving-head $B^2$ in accordance with the set of said index in registry with the respective numerals, and the letter "C" aforesaid indicates the position of the index in which the revolution of the pattern-disk upon the driving-head $B^2$ is continuous. Said results are effected by the controlling mechanism, as follows: As shown in Fig. 8, the plate $H^\times$ upon the lower extremity of the spindle $H^3$ of the index H is in fixed relation with the latter. The sleeve $H^4$ of the dial $H'$ connects the latter in fixed relation with the ratchet-wheel $H^5$ upon the lower extremity of said sleeve. As shown in Fig. 7, the plate $H^\times$ has a peripheral notch $h^\times$ and the ratchet-wheel $H^5$ is provided with seventeen equally-spaced teeth $h^5$, a peripheral blank space $h^6$, and a stop-pin $h^7$, projecting from its upper surface. It is obvious that when the index H is rotatively adjusted with respect to the dial $H'$ the notched plate $H^\times$ is correspondingly adjusted with respect to the ratchet-wheel $H^5$. The sleeve $H^4$ is mounted for rotation in the frame member $A^{12}$, depending from the plate A. The spring $H^8$, which encircles said frame member, is secured thereon at its upper extremity and by the connection of its lower extremity upon the hub of the ratchet-wheel $H^5$ tends to rotate the latter and the aforesaid parts adjustably connected therewith to bring the stop-pin $h^7$ against the stop-lug $H^7$ upon the frame member $A^{13}$. The lever-arms Q $Q'$ are fixed upon the rock-shaft $q$, mounted for rotation in the bearings $a^5$ and $a^6$ upon the frame member $A^5$. The spring $Q^2$, which encircles said shaft $q$, is secured at its upper extremity to the bearing $a^5$ and at its lower extremity to the lever-arm $Q'$. Said spring tends to thrust the parts into the position shown in Fig. 7, with the stop-lug $q'$ upon the lever-arm $Q'$ in contact with the frame member $A^5$. The free extremity of the arm $Q'$ is provided with a pivoted pawl $Q^3$. The spring $q^3$, connecting said pawl with the lever $Q'$, normally maintains the former in the position shown in Fig. 7. The lever-arm Q overhangs the cam-plate $B^6$ in the path of the fixed pin $Q^\times$, projecting from the upper face of said plate, and the relation of the parts is such that said pin $Q^\times$ in the rotation of said disk $B^6$ encounters the lever-arm Q and thrusts the pawl $Q^3$ into engagement with the ratchet-wheel $H^5$, normally progressing the latter the space of one tooth with each revolution of the pattern-disk-rotating shaft B, the keeper-pawl $H^9$, mounted upon the lower extremity of the frame member $A^{13}$, successively engaging the ratchet-teeth $h^5$ by the action of the spring $h^9$. The pawl $H^9$ may be disengaged and the action of the pawl $Q^3$ rendered idle by manually lifting the inclined slide $H^{10}$, the latter engaging the pawl member $h^{10}$. (See Figs. 6, 7, and 32.) However, as hereinafter described, the pawl $H^9$ is automatically disengaged by the arm $k^7$. (See Fig. 32.)

It is obvious from the foregoing description that the release of the ratchet-wheel $H^5$ and the return of the parts connected therewith to the initial position—i. e., with the stop-pin $h^7$ against the stop-lug $H^7$—is consequent upon the operation of the disk-transferring mechanism, of which the arm $k^7$ is a part, said arm serving to disengage the keeper-pawl $H^9$, as aforesaid. Moreover, it is obvious that if the disk-rotating mechanism continues to operate the ratchet-wheel $H^5$ will be rotatively shifted one tooth with each revolution of the disk-rotating mechanism, being actuated by the pawl $Q^3$, as aforesaid, until the seventeen teeth $h^5$ have been successively engaged by said pawl and the latter encounters the blank space $h^6$ in the periphery of the ratchet-wheel $H^5$, whereupon said pawl will be idly reciprocated in the blank space $h^6$ by each succeeding revolution of the disk-rotating mechanism.

As hereinafter explained, whenever the notch $h^\times$ reaches the position shown in Fig. 7 the clutch-shifting mechanism is permitted to operate to terminate the action of the disk-rotating mechanism and initiate the action of the disk-transferring mechanism. As shown in said figure, the notched disk $H^\times$ is adjusted with respect to the ratchet-wheel $H^5$, so that the notch $h^\times$ has been presented in its releasing position by one movement of the pawl $Q^3$ consequent upon one revolution of the disk-rotating mechanism and the cam-plate $B^6$. In accordance with the adjustment of the index H with respect to the dial H' any number of strokes of the pawl $Q^3$ from one to seventeen may be required to present said notch $h^\times$ in said releasing position, and when the index is adjusted to the graduation "C" the seventeen effective strokes of the pawl $Q^3$ do not suffice to present said notch in said position.

As hereinbefore described, the entrance of the arm $F^5$ within the notch $b^6$ of the cam-plate $B^6$ is necessary to shift the clutch $D^2$ to terminate the operation of the disk-rotating mechanism, &c. Said arm $F^5$ is withheld by the notched plate $H^\times$ and its release effected by the notch $h^\times$, as follows:

The rock-shaft R is mounted for oscillation in the frame members A' and $A^5$ and provided with the arm R', engaged with the arm $F^6$, fixed upon the shaft F. The arm $R^2$ is fixed upon the opposite extremity of the shaft R and is provided with the tappet $R^\times$, extending within the peripheral line of the disk $H^\times$.

By reason of the connection of the arm R' with the arm $F^6$ the former is raised when the arm $F^5$ is disengaged from the notch $b^6$ of the cam-plate $B^6$ to initiate the operation of the disk-rotating mechanism. The arm $R^2$ upon the shaft R being thereby lowered from the position shown in Fig. 6, the arm $F^5$ is withheld by the engagement of the tappet $R^\times$ beneath the overhanging disk $H^\times$ and the return of the arm $F^5$ within the notch $b^6$ thereby prevented until the notch $h^\times$ upon the plate $H^\times$ is presented in registry with the tappet $R^\times$, whereupon the latter is free to rise through said notch, and the arm $F^5$ is entered in the notch $b^6$ and the clutch $D^2$, &c., shifted by the action of the spring $F^2$, as aforesaid.

When the pawl $H^9$ is disengaged by the operation of the disk-transferring mechanism, the solid portion of the periphery of the plate $H^\times$ is rotated beneath the tappet $R^\times$, which is in its upper position, as aforesaid. Therefore although said tappet is in rigid relation with the arm $R^2$ for the operation above described I have pivoted it upon the stud $r^2$, so that the parts are normally retained in rigid relation by the tension of the spring $r^3$, with the tappet $R^\times$ at rest against the stop $r^4$. Said arm $R^2$ may therefore be depressed when the notch $h^\times$ in the plate $H^\times$ is not in registry therewith, the terminal piece $R^\times$ being freed by rocking upon the stud $q^2$ against the tension of said spring $r^3$.

The cycle of operation of the various mechanisms connected as above described is as follows: Assuming, as aforesaid, that the position of the parts shown in Fig. 15 is the initial position, with the disk-transferring mechanism beginning to operate the disk-bearing rollers L begin to lower simultaneously with the upward movement of the clamp-shafts K, the withdrawal of the releasing-blades $i$, and the advance of the blades $i'$. When the disk-releasing blades have reached the middle of their stroke, the clamp-shafts K, having reached the limit of their upward movement, begin to swing horizontally outward. When said shafts K have swung forty-five degrees, the pawl $H^9$ being withdrawn by the movement of the arm $k^7$ against the pawl extension $h^{10}$, the spring $H^8$ returns the ratchet-wheel $H^5$ and the parts connected therewith to their initial position, with the stop-pin $h^7$ resting against the stop-lug $H^7$. The outward swinging movement of the shafts K and the aforesaid relative movement of the releasing-blades $i$ and $i'$ terminate simultaneously. The upper blades $i$ having been withdrawn within the heads $I^\times$, the pattern-disks Z settle upon the lower blades $i'$, projecting beneath them. The frame M' of the disk-discharging rollers M begins its upward movement when the clamp-shafts K have swung ninety degrees—i. e., to the limit of their movement. The track-arms N begin their movement to parallel position when said frame M' is at two-thirds of its upward stroke, reaching their parallel position simultaneously with the termination of the upward movement of said frame. The disk-discharging rollers M begin to rotate as soon as the frame M' has reached its upper position and continue to rotate during one and one-fourth revolutions of the main driving-shaft C. Beginning when the shaft C has made three-fourths of a revolution in its actuation of the discharging-rollers M aforesaid, the lower releasing-blades $i'$ begin to withdraw, the upper blades $i$ of course simultaneously advancing above the bottom disk Z, but beneath the remaining disks. The relative movement of said blades is uniform for one half of their stroke. The latter half of said stroke is, however, accelerated, and beginning simultaneously with this acceleration of the blades $i$ and $i'$ the track-arms N diverge to drop upon the rack $a^\times$ the disk Z discharged upon them by the rollers M aforesaid. Simultaneously with said movement of the arms N the vertical guide-rods $j$ and $j^\times$ begin to rise and the frame M' to lower. The diverging movement of the track-arms N terminates with one-third of the downward movement of the frame M', and the upper movement of the guide-rods terminates with one-half of the movement of said frame. Before the roller-frame M' reaches its lowest position the lower releasing-blades $i'$ are withdrawn within the heads I', and the single disk Z, supported by them, is dropped to engage the driving-head $B^2$, the upper blades $i$ sustaining the remaining disks Z, beneath which they have been projected. The vertical guide-rods $j$ and $j^\times$ lower, and with the termination of their movement the clamp-shafts K begin their horizontal return movement, lowering when in their normal radial position with respect to the driving-head $B^2$. When the shafts K are lowered half-way, the disk-bearing rollers L begin to rise, the respective vertical movements continuing until the shafts K are seated in normal position, and the rollers L also assume their normal position in the order named. The weighted lever $O^2$ is then thrown to the position shown in Fig. 18 by the operation of the tripping-cam P, &c., and the disk-rotating mechanism begins to operate by reason of the consequent shifting of the clutch-sleeve $D^2$. The movement of the transferring mechanism having terminated simultaneously with the shifting of the clutch-sleeve $D^2$, the tripping-cam P' is released from its engagement with the arm $F^4$ when the arm $F^5$ is deflected by the roller $B^7$ on the rotating cam-plate $B^6$, said release occurring when said arm is on the radius vector of the roller and disk. During the revolution of the cam-plate $B^6$ the controller ratchet-wheel $H^5$ is shifted by the pawl $Q^3$, and when the notched controller-plate $H^\times$ has been thereby rotated to present the notch $h^\times$ in registry with the tappet $R^\times$ the arm $F^5$ is permitted to enter the notch $b^6$ in the cam-plate $B^6$, and the operation above described is repeated.

I have thus particularly described the relative movements of the respective parts of the convenient embodiment of my invention which I have illustrated in order that the cooperation thereof may be better understood. It is obvious, however, that the precise sequence of operation of said parts is not of the essence of my invention. It is, moreover, obvious that various modifications may be made in the construction and arrangement of the mechanism without departing from the spirit of my invention. I therefore do not desire to limit myself to the precise embodiment thereof which I have shown and described.

As an example of variation in the precise construction of the elements of my invention I have illustrated in Fig. 29 a modified form of device to release the disks Z from their positions upon the standards I in said figure. The blades $i$ and $i'$ are directly mounted upon the vertical shaft $I^2$ in such relation therewith that oscillation of the crank-arm $I^3$ upon the lower extremity of said shaft serves to alternately advance and retract said blades with respect to the edge of the disk Z. It is obvious that such a construction would serve to successively release the disks in the manner hereinbefore described.

I claim—

1. The combination with a holder for a series of disks of the class described, of means to insure the registry of said disks in said series, comprising single peripheral notches in the respective disks for engagement with an alining member of said holder, substantially as set forth.

2. The combination with disk-rotating mechanism, of means to secure a disk upon said rotary mechanism, a roller L, opposed to said securing means, to flex a disk secured upon said rotary mechanism, and means to automatically adjust said roller with respect to said disk, substantially as set forth.

3. The combination with disk-rotating mechanism, of means to disengage a disk from said mechanism, track-bars to receive said disk, and means to release said disk from said track-bars, substantially as set forth.

4. The combination with disk-rotating mechanism, of a frame provided with feed-rollers adapted to uplift and discharge a disk from said mechanism, and means to automatically adjust said frame with respect to said mechanism, substantially as set forth.

5. The combination with disk-rotating mechanism, of a sound-producing device adapted to be operated by a disk, and an adjustable controlling mechanism to predetermine the number of revolutions of said rotary mechanism, with respect to said sound-producing device, substantially as set forth.

6. The combination with disk-rotating mechanism, of a sound-producing device adapted to be operated by a disk, and controlling mechanism comprising an adjustable index to predetermine the number of revolutions of said rotary mechanism with respect to said sound-producing device, substantially as set forth.

7. The combination with disk-rotating mechanism, of a frame M', adapted to disengage a disk from said mechanism, normally stationary disk-discharging rollers M, journaled in said frame, and means for rotating said rollers subsequent to the disengaging movement of said frame, to discharge a superimposed disk, substantially as set forth.

8. The combination with disk-rotating mechanism, of a frame M', means to reciprocate said frame to uplift a disk from said rotating mechanism, disk-discharging rollers M, journaled in said frame, means connective of said rollers to effect their simultaneous rotation, and mechanism to rotate said rollers M, fixed in such relation with the latter as to be automatically engaged therewith subsequent to the uplifting movement of said frame, and disengaged therefrom by reverse movement of said frame, substantially as set forth.

9. In a musical instrument, means for playing a series of tunes automatically in succession, in combination with automatic repeating mechanism constructed to effect the playing of each tune any predetermined number of times before passing to the next tune.

10. In a musical instrument, the combination with means for playing a series of tunes automatically in succession, including means for automatically changing from one tune to another, whether the tune be played one or more times, of automatic repeating mechanism, and means for setting the same to control the number of times each tune is to be played before passing to the succeeding tune.

11. The combination with a musical instrument, of means for moving note-sheets successively into and out of operative relation with said instrument, and automatic repeating mechanism constructed and arranged to cause the several note-sheets to be each played any predetermined number of times while in engagement with the instrument.

12. The combination with a musical instrument, and means for engaging a series of note-sheets successively therewith, of means for playing said note-sheets, automatic repeating mechanism, and means for setting the repeating mechanism to cause each note-sheet to be played any predetermined number of times.

13. The combination with a musical instrument, a magazine for holding a series of note-sheets, means for moving the note-sheets successively from the magazine into operative relation with the instrument, and means for removing the sheets from the instrument when played, of automatic repeating mechanism for causing each sheet to be played a predetermined number of times while in engagement with the instrument, and means for varying the number of times the tunes are to be repeated.

14. The combination with a musical instrument, of means for engaging a note-sheet therewith, and a repeating device adapted to be set to cause said note-sheet to play continuously or a given number of times, depending upon the adjustment of said device.

15. The combination with a musical instrument, of means for engaging a series of note-sheets therewith successively, a repeating device adapted to be set to cause each note-sheet to be played a selected number of times, and means, controlled by the repeating device, for automatically removing a note-sheet after it has been played the desired number of times.

16. The combination with a musical instrument, and means for engaging a note-sheet therewith, of a repeating device arranged to automatically control the number of times the note-sheet shall be played, and means controlled by said repeating device for automatically removing the note-sheet from the instrument and automatically substituting a new note-sheet therefor.

17. The combination of a series of note-sheets, supports for said sheets, each comprising two reciprocating plates, adapted to alternately support all of said sheets, a sounding device, means for withdrawing the supporting-plates from the lowest sheet in said series of sheets and simultaneously moving the other plate of each support between the said lowest and next higher sheet in the series, and means for holding the sheet thus released in engagement with the sounding device.

18. The combination of a horizontally-arranged sounding device, a series of note-sheets adapted to successively actuate the sounding device, supports for holding said series of sheets in inactive positions above the sounding device, and means for automatically withdrawing said supports from the lowest sheet and causing them to engage with the next higher sheet in the series, whereby the said lowest sheet is allowed to move into operative position relative to the sounding device.

19. In a self-playing musical instrument, means for playing a series of note-sheets successively, comprising means for rotating a note-sheet, means for removing said note-sheet when played, and means for supplying a new note-sheet, in combination with a single motor, and means for engaging said motor alternately with the playing and sheet-changing devices and with repeating mechanism to effect the playing of the tunes any predetermined number of times.

20. In a musical instrument, a normally inoperative mechanism for changing note-sheets, a repeating mechanism constructed and arranged to cause a note-sheet to be played a predetermined number of times, and means governed by the repeating mechanism for throwing the note-sheet-changing mechanism into operation when the note-sheet has been played the desired number of times.

21. In a musical instrument, the combination with a continuously-operative motor of a normally inoperative note-sheet-changing mechanism, and automatic means for throwing said mechanism into gear with the motor when the note-sheet has been played a predetermined number of times.

22. The combination with sound-producing mechanism; of disk-rotating mechanism; means to support a series of disks adjacent to said mechanism, comprising a plurality of retractable supports for circumferential engagement with said disks; and means to alternately advance and retract each of said supports with respect to each of said disks; to engage and release the latter, substantially as set forth.

23. The combination with sound-producing mechanism; of disk-rotating mechanism; means to support a series of disks adjacent to said mechanism comprising supports for said disks each comprising two reciprocating plates and means to alternately advance and retract each of said supports with respect to each of said disks; to engage and release the latter, substantially as set forth.

WILLIAM A. DRYSDALE.

Witnesses:
ETHEL A. ADAMS,
ARTHUR E. PAIGE.